United States Patent
Kanda et al.

(10) Patent No.: US 8,938,122 B2
(45) Date of Patent: Jan. 20, 2015

(54) IMAGE PROCESSING APPARATUS, IMAGE PROCESSING METHOD, AND COMPUTER-READABLE RECORDING DEVICE

(75) Inventors: Yamato Kanda, Hino (JP); Makoto Kitamura, Hachioji (JP); Masashi Hirota, Hachioji (JP); Takashi Kono, Tachikawa (JP); Takehiro Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 148 days.

(21) Appl. No.: 13/464,352

(22) Filed: May 4, 2012

(65) Prior Publication Data

US 2012/0288199 A1    Nov. 15, 2012

(30) Foreign Application Priority Data

May 9, 2011    (JP) ................................. 2011-104698

(51) Int. Cl.
*G06K 9/34*    (2006.01)
*G06T 7/00*    (2006.01)

(52) U.S. Cl.
CPC ............. *G06T 7/0083* (2013.01); *G06T 7/0087* (2013.01); *G06T 2207/10024* (2013.01); *G06T 2207/10068* (2013.01); *G06T 2207/20152* (2013.01); *G06T 2207/30096* (2013.01)
USPC ........... 382/173; 358/296; 382/164; 382/176; 382/190; 382/195; 382/203; 382/233; 382/268

(58) Field of Classification Search
None
See application file for complete search history.

(56) References Cited

U.S. PATENT DOCUMENTS

| | | | | |
|---|---|---|---|---|
| 5,767,978 | A * | 6/1998 | Revankar et al. ............. | 358/296 |
| 6,606,408 | B1 * | 8/2003 | Kang et al. .................... | 382/164 |
| 7,076,099 | B2 * | 7/2006 | Kondo et al. ................. | 382/203 |
| 7,844,118 | B1 * | 11/2010 | Li et al. ......................... | 382/195 |
| 7,936,924 | B2 * | 5/2011 | Shi et al. ....................... | 382/173 |
| 7,965,892 | B2 * | 6/2011 | Kanatsu ........................ | 382/176 |

(Continued)

FOREIGN PATENT DOCUMENTS

| | | |
|---|---|---|
| EP | 1 847 955 A1 | 10/2007 |
| JP | 2009-232962 | 10/2009 |

OTHER PUBLICATIONS

Bilodeau, G. et al., "Multistage Graph-Based Segmentation of Thoracoscopic Images", Computerized Medical Imaging and Graphics 30 (2006), pp. 437-446.

European Search Report dated Aug. 13, 2012 from corresponding European Patent Application No. EP 12 00 3438.4.

(Continued)

*Primary Examiner* — Tsung-Yin Tsai
(74) *Attorney, Agent, or Firm* — Scully, Scott, Murphy & Presser, P.C.

(57) ABSTRACT

An image processing apparatus includes a small area divider that divides, on the basis of edge information of an image, the image into multiple small areas each including multiple pixels; an attribute probability estimator that estimates attribute probability for each of the small areas, which is probability that the small area is attributed to a specific area to be detected; an adjacent-small-area connection strength calculator that calculates connection strength that quantitatively indicates a degree to which small areas adjacent to each other among the multiple small areas are attributed to the same area that is the specific area or a non-specific area; and a specific area detector that detects the specific area on the basis of the attribute probability and the connection strength.

11 Claims, 21 Drawing Sheets

(56) References Cited

U.S. PATENT DOCUMENTS

| | | | | |
|---|---|---|---|---|
| 8,320,700 | B2* | 11/2012 | Lee | 382/268 |
| 2004/0086184 | A1* | 5/2004 | Kondo et al. | 382/203 |
| 2005/0247897 | A1* | 11/2005 | Haug et al. | 250/584 |
| 2011/0069876 | A1 | 3/2011 | Kanda | |
| 2011/0243466 | A1* | 10/2011 | Lee | 382/233 |
| 2012/0301032 | A1* | 11/2012 | Kawanishi et al. | 382/190 |
| 2013/0188869 | A1* | 7/2013 | Yoo et al. | 382/173 |

OTHER PUBLICATIONS

Boykov, Yuri Y. et al., "Interactive Graphic Cuts for Optimal Boundary & Region Segmentation of Objects in N-D Images", Proceedings of "International Conference on Computer Vision", Vancouver, Canada, Jul. 2001, vol. 1, pp. 105-112.

Boykov, Yuri Y. et al., "Interactive Graph Cuts for Optimal Boundary & Region Segmentation of Objects in N-D Images", Proceedings of "International Conference on Computer Vision", Vancouver, Canada, Jul. 2001, vol. 1, pp. 105-112.

* cited by examiner

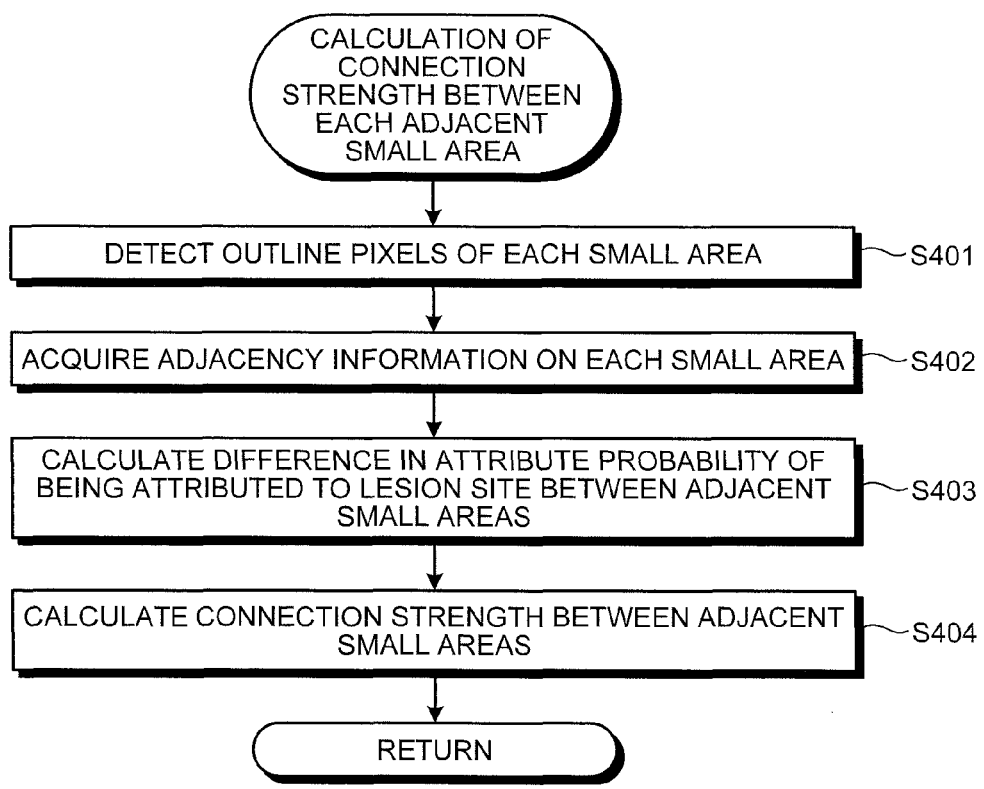
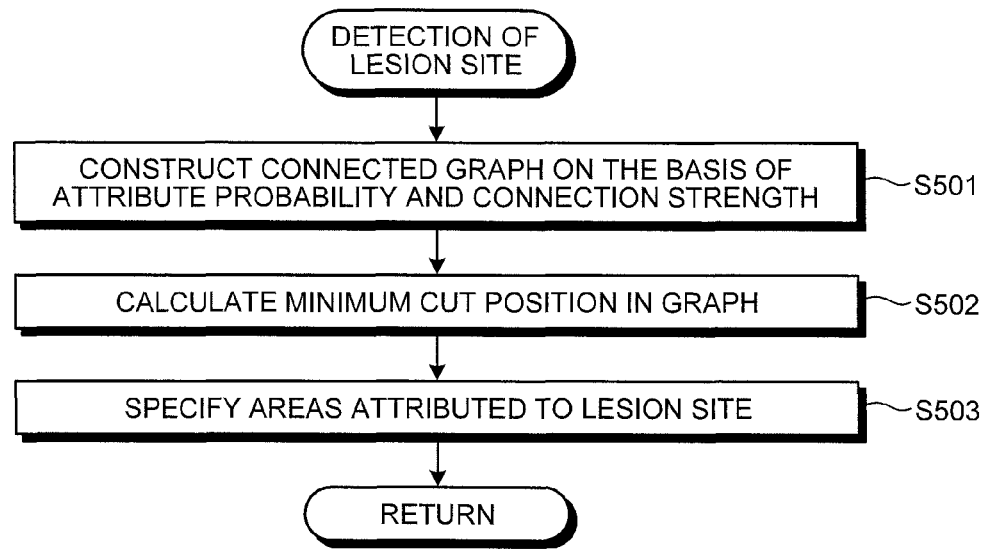

IMAGE PROCESSING APPARATUS, IMAGE PROCESSING METHOD, AND COMPUTER-READABLE RECORDING DEVICE

CROSS-REFERENCE TO RELATED APPLICATIONS

This application is based upon and claims the benefit of priority from Japanese Patent Application No. 2011-104698, filed on May 9, 2011, the entire contents of which are incorporated herein by reference.

BACKGROUND OF THE INVENTION

1. Field of the Invention

The present invention relates to an image processing apparatus that detects a specific area from an image, an image processing method, and a computer-readable recording device.

2. Description of the Related Art

As a technology related to the division of an image into areas, a method is disclosed in Japanese Laid-open Patent Publication No. 2009-0232962 in which an area to be discriminated in an image is divided into a target area (kidney area) and a background area by using a graph cut area division method and thus the kidney area is extracted.

The graph cut area division method is a method of dividing, as described in the following, an image into a specific area to be detected and a non-specific area that is the background of the area to be detected. First, a connected graph is created. Multiple nodes N corresponding to multiple pixels in an image and two nodes S and T, which are determination labels for each pixel and correspond to the specific area and the non-specific area, are connected via links. Each link represents by its size the probability for each pixel that the pixel is attributed to the specific area or the non-specific area. Furthermore the nodes corresponding to pixels and adjacent to each other are connected via links. Each link represents by its size the probability that the adjacent pixels are contained in the same area. Then, by cutting off the links in the connected graph, the group of nodes N is separated into a group connected to the node S and a group connected to the node T. The links are cut off such that the sum of the probability is the minimum using the max-flow min-cut theorem of graph network theory (i.e., the sum of the probability of uncut links is the maximum), thereby area division is optimized (see Y. Boykov, M. Jolly, "Interactive Graph Cuts for Optimal Boundary & Region Segmentation of Objects in N-D Images", Proceeding of "International Conference on Computer Vision", July 2001, vol. 1, pp. 105-112).

SUMMARY OF THE INVENTION

An image processing apparatus according to an aspect of the present invention includes: a small area divider that divides, on the basis of edge information of an image, the image into multiple small areas each including multiple pixels; an attribute probability estimator that estimates attribute probability for each of the small areas, which is probability that the small area is attributed to a specific area to be detected; an adjacent-small-area connection strength calculator that calculates connection strength that quantitatively indicates a degree to which small areas adjacent to each other among the multiple small areas are attributed to the same area that is the specific area or a non-specific area other than the specific area; and a specific area detector that detects the specific area by dividing the image into the specific area and the non-specific area on the basis of the attribute probability and the connection strength.

An image processing method according to another aspect of the present invention includes: on the basis of edge information of an image, dividing the image into multiple small areas each including multiple pixels; estimating attribute probability for each of the small areas, which is probability that the small area is attributed to a specific area to be detected; calculating connection strength that quantitatively indicates a degree to which small areas adjacent to each other among the multiple small areas are attributed to the same area that is the specific area or a non-specific area other than the specific area; and detecting the specific area by dividing the image into the specific area and the non-specific area on the basis of the attribute probability and the connection strength.

A computer-readable recording device according to still another aspect of the present invention has an executable program stored thereon, wherein the program instructs a processor to perform: on the basis of edge information of an image, dividing the image into multiple small areas each including multiple pixels; estimating attribute probability for each of the small areas, which is probability that the small area is attributed to a specific area to be detected; calculating connection strength that quantitatively indicates a degree to which small areas adjacent to each other among the multiple small areas are attributed to the same area that is the specific area or a non-specific area other than the specific area; and detecting the specific area by dividing the image into the specific area and the non-specific area on the basis of the attribute probability and the connection strength.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart of operations of the adjacent-small-area connection strength calculator shown in FIG. 1;

FIG. 9 is a flowchart of operations of the lesion site detector shown in FIG. 1;

DETAILED DESCRIPTION OF THE PREFERRED EMBODIMENTS

An image processing apparatus, an image processing method, and a computer-readable recording device according to embodiments of the present invention will be described below with reference to the accompanying drawings. Note that the embodiments do not limit the present invention. The same or like parts are designated by the same reference numbers throughout the drawings.

As an example, image processing will be described below on a lumen image (digestive tract image) obtained by imaging the inside of the lumen (digestive tract) of a subject by using a medical observation apparatus, such as an endoscope or a capsule endoscope. The lumen image is, for example, a color image having, in each pixel, a pixel level (pixel value) of each of the color components of R (red), G (green), and B (blue).

The present invention is not limited to lumen images but can be widely applicable to other image processing apparatuses that detect a specific area from a normal image.

Hereinafter, a lesion site in a lumen image is described as a specific area to be detected and a non-lesion site other than the lesion site (mucosa, contents of the lumen such as residue, bubbles, etc.) are described as non-specific areas that are the background. However, desired sites may be set as a specific area and a non-specific area, e.g., a lesion site and mucosa are set as a specific area and an area other than the lesion site and mucosa (contents and bubbles) may be set as a non-specific area.

First Embodiment

Figure 1:
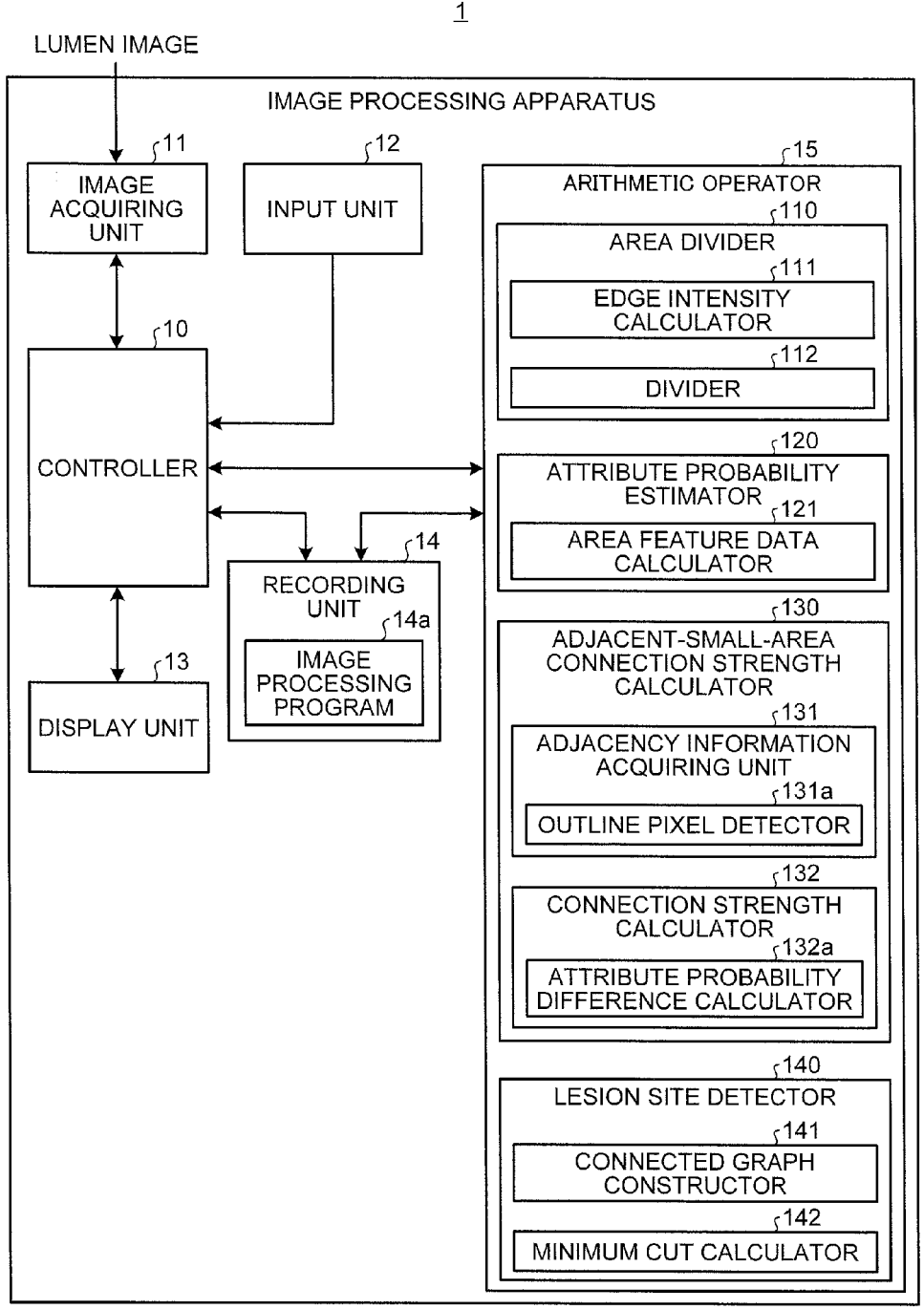
FIG. 1 is a block diagram of a configuration of an image processing apparatus according to a first embodiment of the present invention.

FIG. 1 is a block diagram of a configuration of an image processing apparatus according to a first embodiment of the present invention. As shown in FIG. 1, an image processing apparatus 1 includes a controller 10 that controls the whole operation of the image processing apparatus 1; an image acquiring unit 11 that acquires image data of a lumen image that is captured by the medical observation apparatus; an input unit 12 that receives input signals that are input from the outside; a display unit 13 that displays a screen including a lumen image and various types of information; a recording unit 14; and an arithmetic operator 15 that performs arithmetic operation processing for detecting a specific area from a lumen image.

The controller 10 is a configuration of hardware, such as a CPU. By reading various programs stored in the recording unit 14, the controller 10 transfers instructions and data to each unit forming the image processing apparatus 1 in accordance with image data that is input from the image acquiring unit 11 and operation signals that are input from the input unit 12 and accordingly entirely controls operations of the image processing apparatus 1.

The image acquiring unit 11 is appropriately configured according to the mode of the system that includes the medical observation apparatus. For example, if the medical observation apparatus is a capsule endoscope and a portable recording medium is used to receive image data of lumen images from the medical observation apparatus, the recording medium can be removably attached to the image acquiring unit 11 and the image acquiring unit 11 is configured from a reader device that reads image data stored in the recording medium. If a server that saves image data of lumen images acquired by the medical observation apparatus is set, the image acquiring unit 11 is configured from a communication device, etc. that is connected to the server and the image acquiring unit 11 acquires image data by communicating with the server. Alternatively, the image acquiring unit 11 may be configured from an interface device that inputs image signals via a cable from the medical observation apparatus, such as an endoscope.

The input unit 12 is configured from, for example, a key board, a mouse, a touch panel, and various switches. The input unit 12 outputs input signals received from the outside to the controller 10.

The display unit 13 is a configuration of a display device, such as an LCD or an EL display.

The recording unit 14 is a configuration of an information recording device, such as various IC memories, such as ROM and RAM that are updatable and recordable flash memories, an internal/external hard disk, or a CD-ROM; and a reading device. The recording unit 14 stores, in addition to the image data of lumen images acquired by the image acquiring unit 11, a program for causing the image processing apparatus 1 to operate and execute various functions and data used during execution of the program. For example, the recording unit 14 stores an image processing program 14a for detecting a specific area from a lumen image.

The arithmetic operator 15 is a configuration of hardware, such as a CPU. By reading the image processing program 14a, the arithmetic operator 15 processes the image data of a lumen image and performs various types of arithmetic processing for detecting a specific area from the lumen image. The arithmetic operator 15 includes an area divider 110, an attribute probability estimator 120, an adjacent-small-area connection strength calculator 130, and a lesion site detector 140.

The area divider 110 divides the lumen image into small areas each including pixels on the basis of edge information of the lumen image. Specifically, the area divider 110 includes an edge intensity calculator 111 that calculates edge intensity of each pixel in the lumen image; and a divider 112 that divides the lumen image into multiple small areas by using the ridges of the edge intensity as the boundary.

The attribute probability estimator 120 estimates the probability (attribute probability) for each small area that the small area is attributed to the specific area. Specifically, the attribute probability estimator 120 includes an area feature data calculator 121 that calculates for each small area feature data on the small area. On the basis of the feature data on each small area, the attribute probability estimator 120 estimates the probability of being attributed to the specific area (specific-area attribute probability). The feature data used to estimate attribute probability is, for example, color feature data and texture feature data of small areas.

The adjacent-small-area connection strength calculator 130 calculates connection strength between two small areas that are adjacent to each other (also referred to as adjacent small areas). The connection strength is data that quantitatively indicates the degree to which the adjacent small areas are attributed to the same area, i.e., are attributed to the specific area or the non-specific area. Specifically, the adjacent-small-area connection strength calculator 130 includes an adjacency information acquiring unit 131 that acquires, for each small area, adjacency information on a small area that is adjacent to the small area; and a connection strength calculator 132 that calculates connection strength between the small areas adjacent to each other on the basis of the adjacency information.

The adjacency information acquiring unit 131 includes an outline pixel detector 131a that detects the outline pixels of each small area. On the basis of the information on the outline pixels of each small area, the adjacency information acquiring unit 131 acquires adjacency information.

The connection strength calculator 132 further includes an attribute probability difference calculator 132a that calculates the difference in attribute probability between the adjacent small areas. On the basis of the difference in attribute probability, the connection strength calculator 132 calculates connection strength between the adjacent small areas.

On the basis of the attribute probability estimated by the attribute probability estimator 120 and the connection strength calculated by the adjacent-small-area connection strength calculator 130, the lesion site detector 140 detects a lesion area as a specific area from the lumen image. The lesion site detector 140 divides the lumen image into a lesion site and a site other than the lesion site (non-lesion site) by using a graph cut area division method. Specifically, the lesion site detector 140 includes a connected graph constructor 141 that constructs a connected graph on the basis of the attribute probability and the connection strength; and a minimum cut calculator 142 that calculates a minimum cut position in the connected graph. By cutting the connected graph including nodes corresponding to the small areas according to the max-flow min-cut theorem, the lesion site detector 140 divides the small areas into a small area group attributed to the lesion site and a small area group attributed to the non-lesion site.

Figure 2:
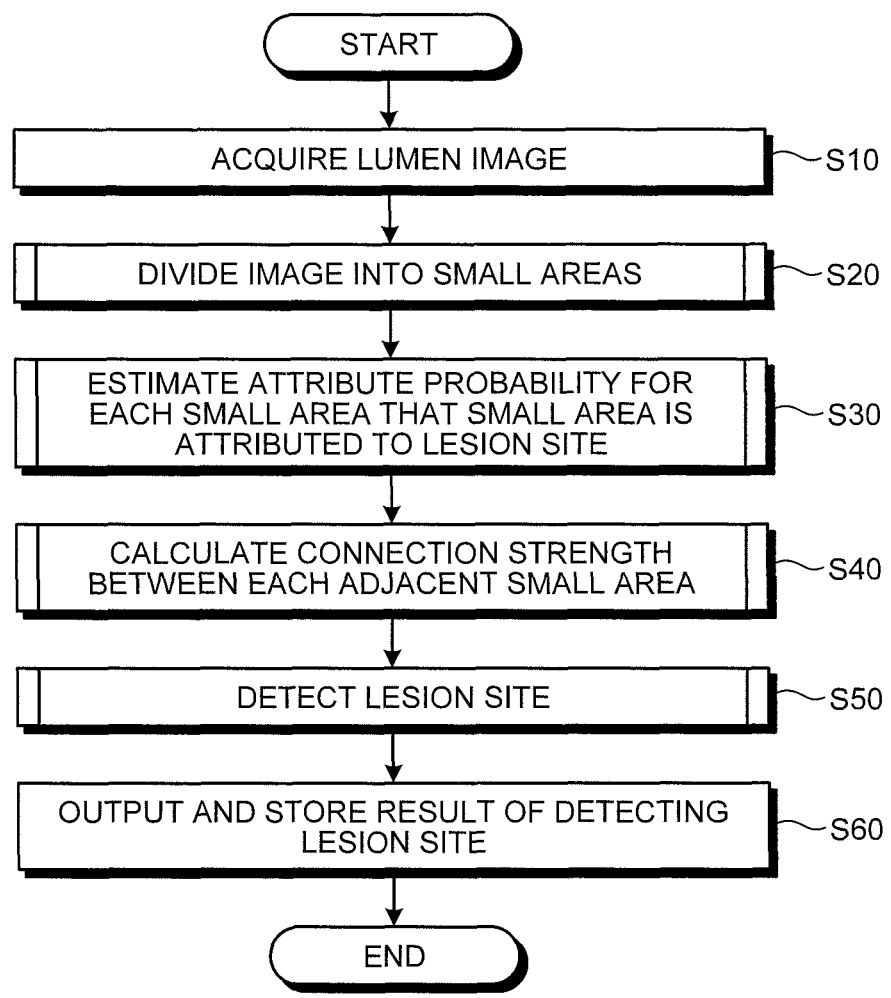
FIG. 2 is a flowchart of operations of the image processing apparatus shown in FIG. 1.

Operations of the image processing apparatus 1 will be described with reference to FIG. 2 here. FIG. 2 is a flowchart of operations of the image processing apparatus 1.

Figure 3:
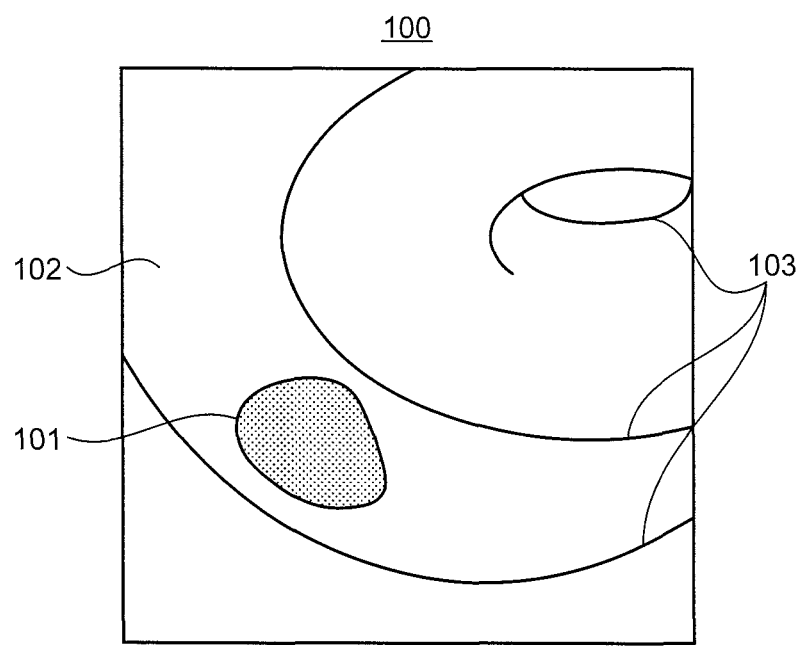
FIG. 3 is a schematic diagram of an exemplary image of a lumen on which image processing is performed.

At step S10, the arithmetic operator 15 acquires a lumen image to be processed from the recording unit 14. FIG. 3 is a schematic diagram of an exemplary lumen image. Hereinafter, processes performed on a lumen image 100 (or simply, an image) shown in FIG. 3 will be described. The image 100 includes a lesion site 101 to be detected and a non-lesion area 102, which is other than the lesion area 101. The image 100 further includes a boundary 103 of a structure corresponding to the folds of mucosa.

Figure 4:
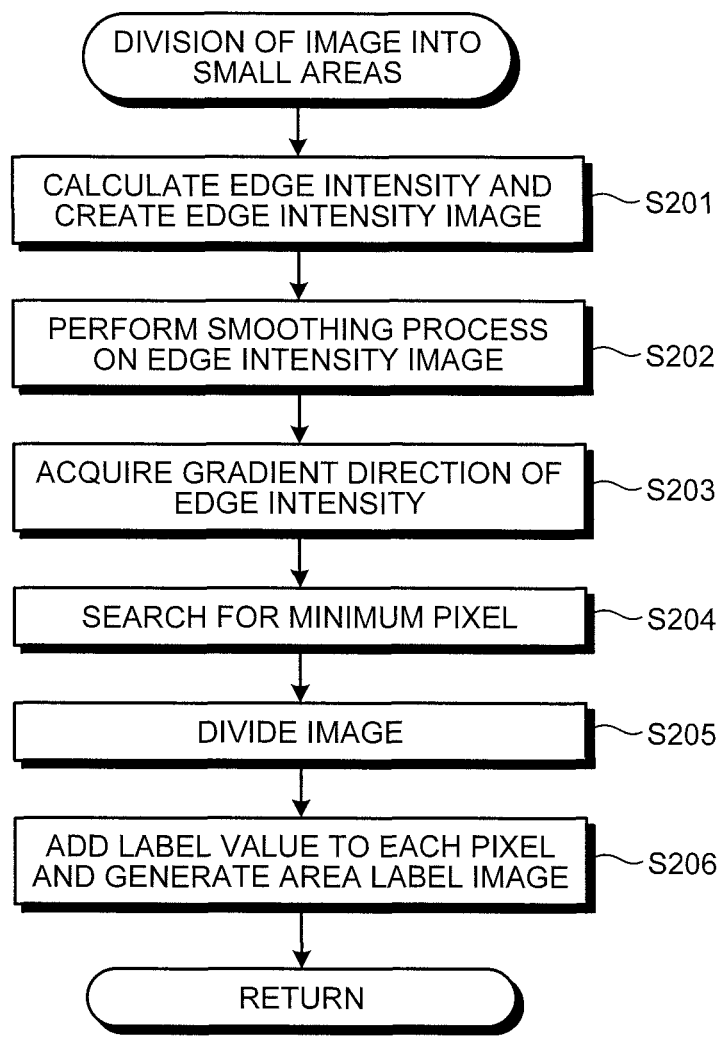
FIG. 4 is a flowchart of operations of the area divider shown in FIG. 1.

At step S20, on the basis of edge information, the area divider 110 divides the image 100 into multiple small areas each including multiple pixels. FIG. 4 is a flowchart of operations of the area divider 110 at step S20.

At step S201, the edge intensity calculator 111 calculates edge intensity of each pixel in the image 100 and creates an edge intensity image. Specifically, the edge intensity calculator 111 performs a known differential filter process, such as Sobel filtering, on G components among pixel values of the pixels (see CG-ARTS Association, "Digital Image Processing" pp. 114 to 121). The G components are used because the G components absorb light in a band that is close to the band in which blood absorbs light and thus the structure information on the boundary in the lumen image between the lesion, mucosa, and contents can be well reflected. At step S201, edge intensity may be calculated on the basis of color components other then the G components and values that are secondarily calculated from the pixel values by using a known conversion process. Specifically, the luminance calculated by YCbCr conversion, color difference, hue calculated by HSI conversion, chroma, and brightness can be used.

At step S202, the divider 112 performs a smoothing process to remove noises on the edge intensity image, if necessary.

At step S203, the divider 112 acquires the gradient direction of the edge intensity of each pixel in the edge intensity image. The gradient direction is the direction in which the value of the edge intensity decreases.

At step S204, the divider 112 searches for a pixel of the minimum value that is reached from each pixel along the gradient direction.

At step S205, the divider 112 divides the image such that the pixels from which the pixels of minimum values adjacent to each other are reached are contained in the same area.

Figure 5:
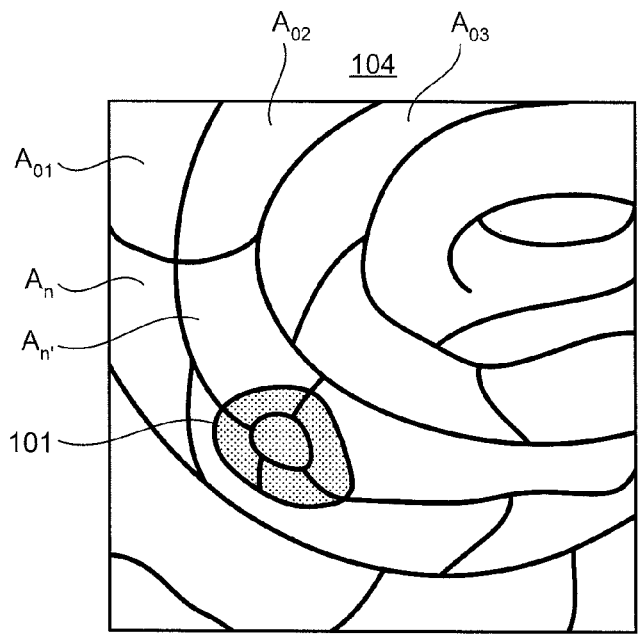
FIG. 5 is a schematic diagram depicting the lumen image shown in FIG. 3 divided into small areas.

At step S206, the divider 112 adds a label value for identifying each divided area to each pixel and generates an area label image where the label values indicates pixel values. FIG. 5 is a schematic diagram of an exemplary area label image obtained as described above. As shown in FIG. 5, an area label image 104 includes multiple small areas $A_n$ (n=01, 02, . . . ), whose label values are different from each other.

For the details of the method of dividing an image by using ridges of edge intensity, see, for example, International Publication Pamphlet No. WO 2006/080239. A watershed algorithm may be used as a method of dividing an image on the basis of edge intensity m (see, Luc Vincent and Pierre Soille, "Watersheds in Digital Spaces: An Efficient Algorithm Based on Immersion Simulations", IEEE Transactions on Pattern Analysis and Machine Intelligence, Vol. 13, No. 6, pp. 583-598, June 1991). The watershed algorithm is a method of dividing an image such that, when the landform where pixel value information is regarded as the altitude is filled with water, a boundary appears as water that collects in different pockets. By using the watershed algorithm, an image division result can be obtained that is almost the same as that obtained by using the above-described method of dividing an image where ridges of the edge intensity serve as the boundary.

Figure 6:
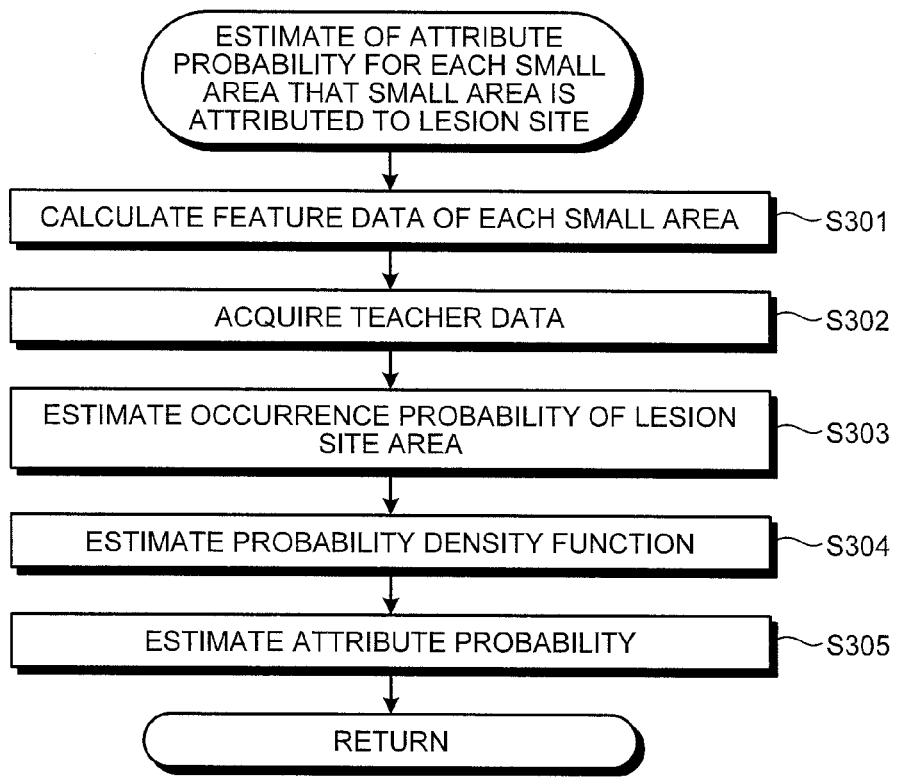
FIG. 6 is a flowchart of operations of the attribute probability estimator shown in FIG. 1.

At step S30 in FIG. 2, the attribute probability estimator 120 estimates the attribute probability for each small area $A_n$ that it is attributed to the lesion site 101. In the first embodiment, a method is used in which the feature data distribution in the pre-created teacher data is approximated using a probability model (probability density function) and attribute probability is estimated on the basis of the probability model. FIG. 6 is a flowchart of operations of the attribute probability estimator 120 at step S30.

At step S301, the area feature data calculator 121 calculates feature data on each small area $A_n$. The feature data that is used is data indicating the overall features of a small area $A_n$, which is not each pixel but a collection of pixels, such as statistical data of each of the RGB components of pixel values of pixels in each small area $A_n$ (average, dispersion, distortion, kurtosis, frequency distribution, etc.) or texture information on each small area $A_n$ (frequency feature, texture feature data such as a simultaneous co-occurrence matrix, etc., see CG-ARTS Association, "Digital Image Processing", pp. 192 to 195). Alternatively, statistical data (described above) may be used as the feature data, such as the luminance, color difference, hue, chroma, brightness, and color ratio that are secondarily calculated from each of the RGB components of pixel values of pixels in each small area $A_n$, or texture information based on these secondarily calculated vales.

At step S302, the attribute probability estimator 120 acquires teacher data that is pre-created and stored in the recording unit 14. The teacher data is a data set in which feature data of the small areas and results of determination on whether the small areas are attributed to the lesion site are associated with each other.

At step S303, the attribute probability estimator 120 estimates the teacher-data based occurrence probability Pc that a small area is attributed to the lesion area (hereinafter, lesion site area) by dividing the number $N_S$ of small areas that are determined to be attributed to the lesion site by the total number of small areas ($N_S+N_T$). Here, $N_T$ is the number of small areas determined to be attributed to the non-lesion site in the teacher data.

At step S304, the attribute probability estimator 120 estimates a probability density function of the lesion site area and a probability density function of the non-lesion site area. The estimate is performed by using a known expectation maximization algorithm (EM algorithm) to apply a contaminated normal distribution to the feature data distributions of the small areas determined to be attributed to the lesion site and small areas determined to be attributed to the non-lesion site. The EM algorithm is an arithmetic operating method for estimating parameters by repeating the calculation of an expected value of a model based on a given parameter and the calculation of a parameter for maximizing the calculated expected value.

Figure 7A:
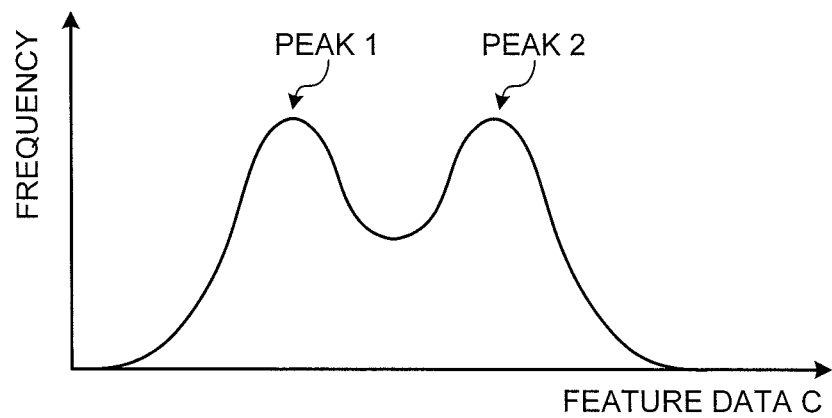
FIG. 7A is a graph of feature data distribution of the small areas in teacher data.

For example, FIG. 7A depicts feature data distribution of the small areas in the teacher data. Peak 1 shown in FIG. 7A corresponds to the peak of the frequency of small areas determined to be attributed to the lesion site and Peak 2 corresponds to the peak of frequency of small area determined to be attributed to the non-lesion site.

Figure 7B:
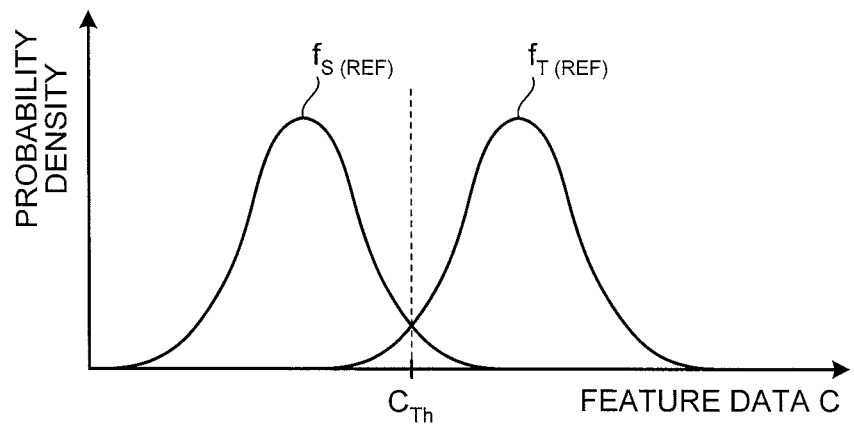
FIG. 7B is a graph of exemplary probability density functions that are estimated on the basis of the teacher data.

FIG. 7B is a graph indicating probability density functions where the feature data serves as a probability variable, which is a probability density function acquired on the basis of the feature data distribution shown in FIG. 7A. The probability density function $f_{S(REF)}$ shown in FIG. 7B corresponds to a probability density of small areas attributed to the lesion site and the probability density function $f_{T(REF)}$ shown in FIG. 7B corresponds to a probability density of small areas attributed to the non-lesion site. The feature data $C_{Th}$ is feature data obtained when the probability density is approximately equal in both probability density functions $f_{S(REF)}$ and $f_{T(REF)}$.

At step S305, the attribute probability estimator 120 estimates the attribute probability $P_n$ for each small area $A_n$ that it is attributed to the lesion site 101 in the image 100 (or the attribute probability $P_n'$ for each small area An that it is attributed to the non-lesion area 102). The attribute probability $P_n$ is estimated by performing a maximum posteriori probability estimate according to the occurrence probability Pc of the lesion site area and the probability density function $f_{S(REF)}$ (or the occurrence probability Pc' (Pc'=1-Pc) of the non-lesion site area and the probability density function $f_{T(REF)}$) in the teacher data.

Although the series of processes for an attribute probability estimate are repeatedly performed in the above description, an estimate of occurrence probability and estimate of probability density functions based on the teacher data (steps S302 to S304) may be previously performed and the coefficients of the occurrence probability and the probability density functions may be recorded in the recording unit 14. In this case, when actually estimating attribute probability, it is satisfactory if the arithmetic operation at step S305 is performed by using the feature data calculated at step S301 and by using the occurrence probability and the coefficients of the probability density functions that are read from the recording unit 14.

The procedure of the attribute probability estimate using a normal distribution will be described in detail below.

First, the occurrence probability Pc of a lesion site area in the following Equation (1) and the occurrence probability Pc' (Pc'=1-Pc) of a non-lesion site area are previously obtained using the teacher data.

$$Pc = \frac{\text{Number of areas determined to belong to lesion site in teacher data}}{\text{total number of areas in teacher data}} \quad (1)$$

According to the feature data Ci of the multiple types of data determined to be attributed to the lesion site in the teacher data, an average μ and a variance Z are given by the following Equations (2) and (3):

$$\mu = \frac{1}{N_D}\sum_{i=1}^{N_D} Ci \quad (2)$$

$$Z = \frac{1}{N_D}\sum_{i=1}^{N_D} (Ci-\mu)^2 \quad (3)$$

where $N_D$ is the number of types of data.

Furthermore, on the basis of these values, the coefficients are calculated of the probability density function $f_s(C_n)$ of lesion site area shown in Equation. (4):

$$f_s(C_n) = \boxed{\frac{1}{\sqrt{2\pi Z}}} \exp\left\{-\frac{(C_n-\boxed{\mu})^2}{\boxed{2Z}}\right\} \quad (4)$$

where $C_n$ is the feature data of the small area to be discriminated. In Equation (4), the parts surrounded by the broken line are the coefficients to be obtained.

The coefficients of the probability density function $f_T(C_n)$ of the non-lesion area is similarly calculated but with different data.

The occurrence probability Pc and Pc' of a lesion site area and a non-lesion site area and the coefficients of the probability density functions $f_s(C_n)$ and $f_T(C_n)$ of the lesion site area and the non-lesion site area, which are previously obtained as described above, are recorded and, on the basis of these values and the feature data $C_n$ of the small area to be discriminated, the attribute probability $P_n$ is calculated of attribute of the small area to be discriminated to the lesion site by using the following Equation (5):

$$P_n = \frac{Pc \times f_S(C_n)}{Pc \times f_S(C_n) + Pc' \times f_T(C_n)} \quad (5)$$

When the probability density function is estimated by applying the contaminated normal distribution, the following Equation (6) is used, which is an equation of a liner sum of the normal distribution $f_S(C_n)$:

$$\text{Probability density function} = \sum_{j=1}^{jN} a_j \times f_{S_j}(C_n) \quad (6)$$

where $a_j \geq 0$ and $$\sum_{j=1}^{jN} a_j = 1.$$

In the first embodiment, the method used to estimate attribute probability on the basis of the probability density function is a method in which the attribute probability is a continuous value. However, the attribute probability is not necessarily a continuous value. For example, the probability of being attributed/not attributed to the lesion site may be represented by one of two values: 1 or 2. In this case, the attribute probability is estimated by using a known method, such as a decision tree used for pattern recognition, etc., a neighborhood method, or a support vector machine.

At step S40 shown in FIG. 2, the adjacent-small-area connection strength calculator 130 calculates connection strength between small areas adjacent to each other. FIG. 8 is a flowchart of operations of the adjacent-small-area connection strength calculator 130 at step S40.

At step S401, the outline pixel detector 131a detects outline pixels of each small area $A_n$. Known various methods can be used as the method of detecting outline pixels. In the first embodiment, pixels of interest are sequentially set while raster scanning the area label image generated at step S206; the label value of the pixel of interest is compared to the label values of adjacent pixels adjacent to the top, bottom, right, or left of a pixel of interest; and the pixel of interest is detected as an outline pixel when its label value is different from the label values.

At step S402, the adjacency information acquiring unit 131 acquires adjacency information on a small area $A_{n'}$ (n'≠n) adjacent to each small area $A_n$. The adjacency information is information indicating which small area $A_n$ is adjacent to which small area $A_{n'}$. The adjacency information acquiring unit 131 records, as adjacency information, the label value added to the pixel of interest that is detected as an outline pixel at step S401 and the label value of the adjacent pixel when the pixel of interest is determined as an outline pixel.

At step S403, the attribute probability difference calculator 132a calculates the difference ΔP in attribute probability of attributed to the lesion site 101 between the adjacent areas (hereinafter, attribute probability difference). Specifically, the attribute probability difference calculator 132a specifies small areas $A_n$ and $A_{n'}$ adjacent to each other on the basis of the adjacency information acquired at step S402 and calculates, as an attribute probability difference ΔP, the difference (absolute value) $|P_n - P_{n'}|$ between the attribute probability $P_n$ of the small area $A_n$ and the attribute probability $P_{n'}$ of the small area $A_{n'}$.

At step S404, the connection strength calculator 132 calculates the connection strength between each adjacent small area on the basis of the attribute probability difference ΔP calculated at step S402. The fact that the attribute probability difference ΔP with respect to the lesion site 101 between the small areas $A_n$ and $A_{n'}$ adjacent to each other is small means that it is highly likely that the small areas $A_n$ and $A_{n'}$ are attributed to the same area and the connection strength is high. Thus, the connection strength calculator 132 uses the attribute probability difference ΔP as a variable, sets a reduction function that increases the connection strength as the attribute probability difference ΔP becomes smaller, and calculates the connection strength between the small areas $A_n$ and $A_{n'}$ by using the reduction function. Alternatively, the connection strength calculator 132 may generate a conversion table in which the attribute probability difference ΔP and the connection strength are associated with each other such that the connection strength increases as the attribute probability difference ΔP becomes smaller and may acquire the connection strength by referring to the conversion table.

At step S50 in FIG. 2, the lesion site detector 140 detects the lesion site 101 from the image 100. FIG. 9 is a flowchart of operations of the lesion site detector 140 at step S50.

Figure 10A:
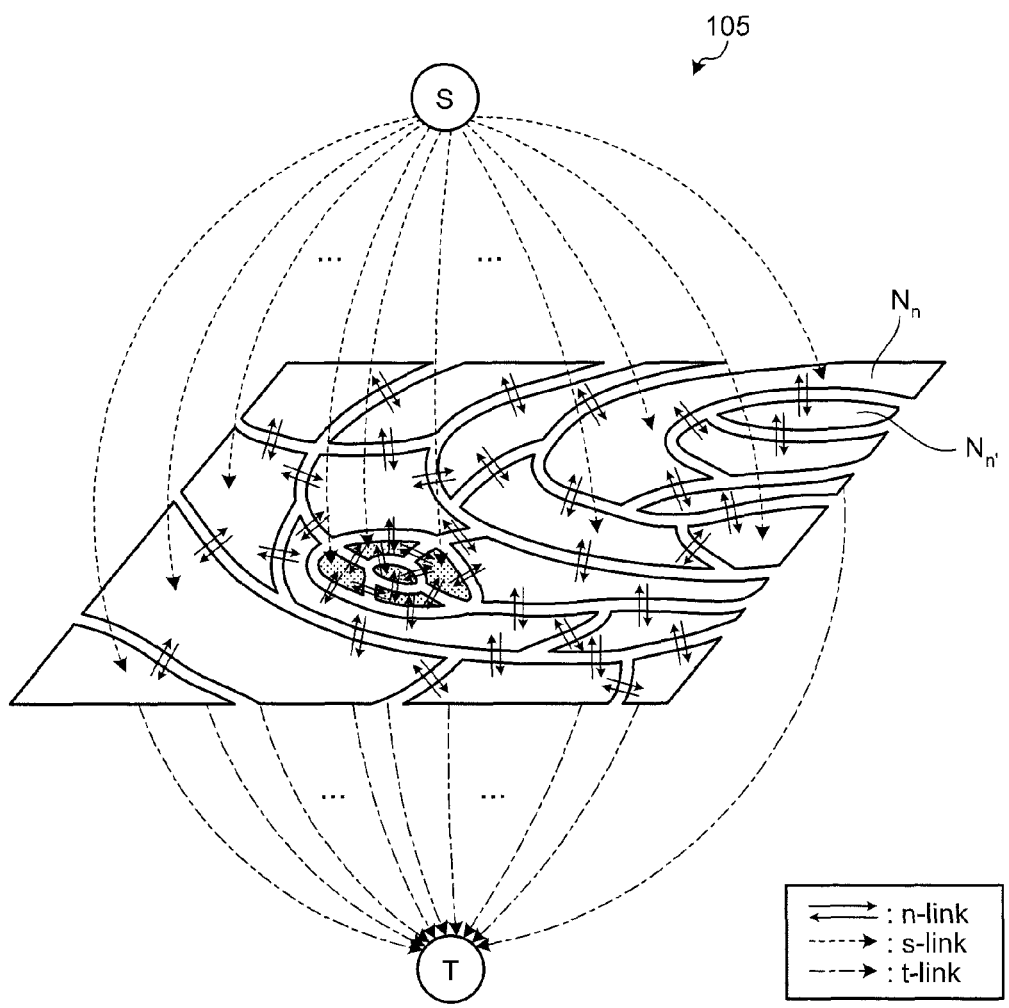
FIG. 10A is a schematic diagram of an exemplary connected graph.
Figure 10B:
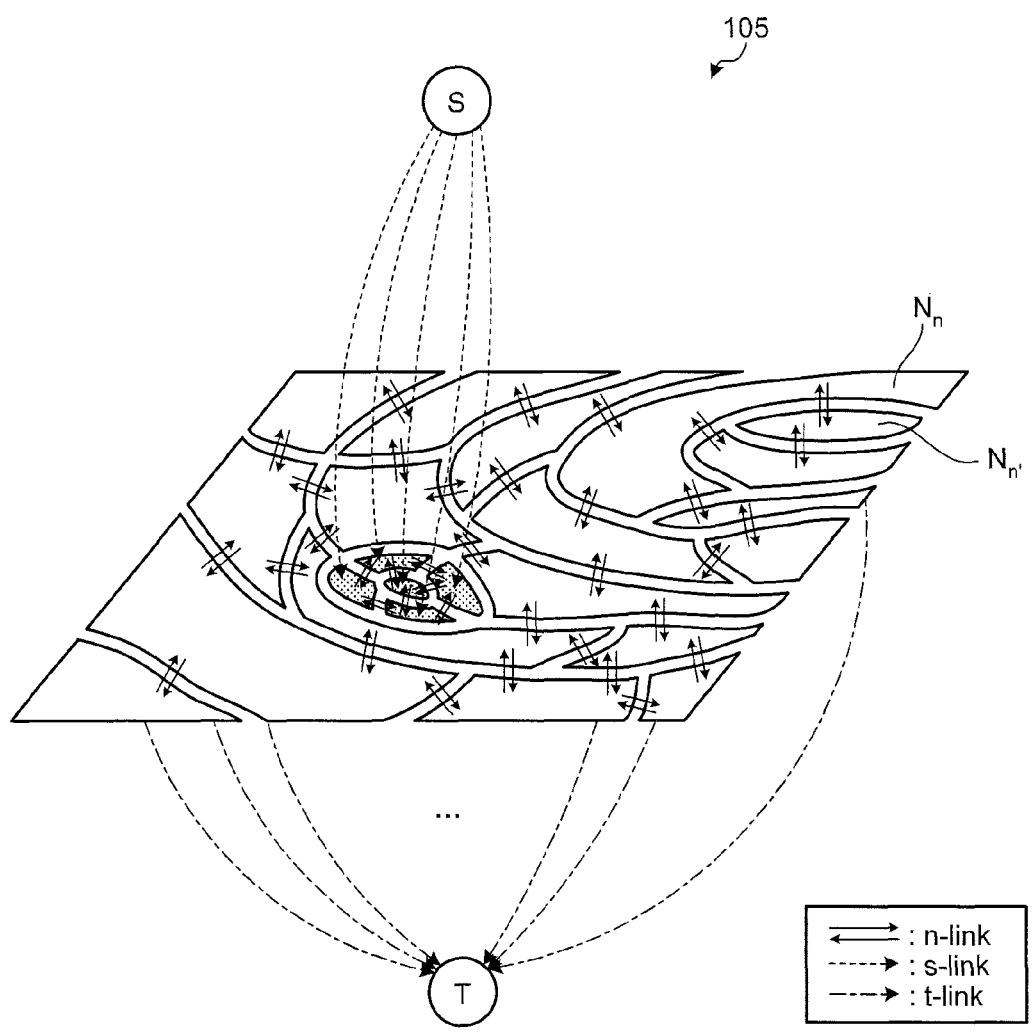
FIG. 10B is a schematic diagram depicting that the connected graph shown in FIG. 10A is cut according to a max-flow min-cut theorem.

At step S501, on the basis of the attribute probability estimated at step S30 and the connection strength calculated at step S40, the connected graph constructor 141 constructs a connected graph 105 in which nodes $N_n$ corresponding to small areas $A_n$, the node S corresponding to the lesion site 101, and the node T corresponding to the non-lesion site 102 are connected (see FIG. 10A). In the connected graph 105, the node S and each node $N_n$ are connected via S links (s-link) having a size corresponding to the attribute probability $P_n$ that the corresponding small area $A_n$ is attributed to the lesion site 101. The node T and each node $N_n$ are connected via T links (t-link) having a size corresponding to the attribute probability $(1-P_n)$ that the corresponding small area $A_n$ is attributed to the non-lesion site 102. Furthermore, the nodes $N_n$ and $N_{n'}$ adjacent to each other are connected via N links (n-link) having a size corresponding to the connection strength between the corresponding small areas $A_n$ and $A_{n'}$.

At step S502, the minimum cut calculator 142 calculates a minimum cut position in the connected graph 105. The minimum cut position is a cut position with which, when any of the S links, T links, and the N links are cut such that all nodes $N_n$ are divided into the node $N_n$ group attributed to the node S and the node $N_n$ group attributed to the node T, the sum of the attribute probability $P_n$ of the cut S link, the attribute probability $1-P_n$ of the T link, and the connection strength of the N link is a minimum value. Such a minimum cut position is calculated on the basis of the max-flow min-cut theorem in graph-network theory (see, Y. Boykov, M. Jolly, "Interactive Graph Cuts for Optimal Boundary & Region Segmentation of Objects in N-D Images", Proceeding of "International Conference on Computer Vision", July 2001, vol. 1, pp. 105-112).

At step S503, the lesion site detector 140 specifies small areas $A_n$ attributed to the lesion site 101 on the basis of the minimum cut position calculated at step S502. Specifically, as a result of cutting the connected graph 105 at the minimum cut position, the small areas $A_n$ corresponding to the nodes $N_n$ whose link relationship with the node S is maintained serve as small areas $A_n$ attributed to the lesion site 101.

At step S60, the arithmetic operator 15 outputs the small areas $A_n$ specified at step S503, which is a result of the detection of the lesion site, to the display unit 13 and records the small areas $A_n$ in the recording unit 14.

As described above, in the first embodiment, the lumen image is divided into multiple small areas on the basis of the edge information of the lumen image, the attribute probability for each small area that it is attributed to the specific area (lesion site) and the connection strength to the adjacent small areas are calculated, and the image is divided into the specific area and the non-specific area on the basis of the attribute probability and the connection strength. Accordingly, according to the first embodiment, area division can be performed in consideration of a feature derived from the small area of a collection of pixels. Accordingly, the accuracy with which a specific area is detected from a lumen image can be improved.

Furthermore, according to the first embodiment, because area division using the graph cut method is performed per small area, the result of the detection of a specific area can be obtained more quickly in comparison with the conventional method while reducing the number of arithmetic operations.

Second Embodiment

A second embodiment of the present invention will be described below.

Figure 11:
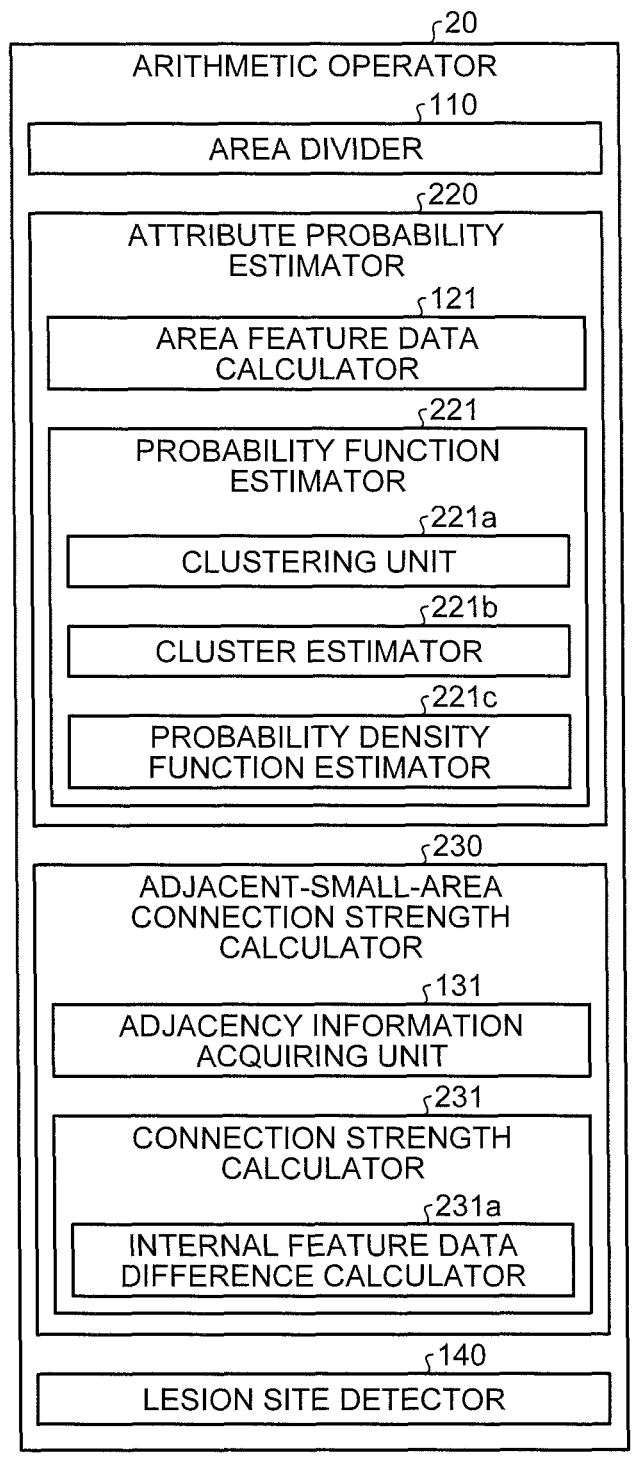
FIG. 11 is a schematic diagram of a configuration of an arithmetic operator of an image processing apparatus according to a second embodiment of the present invention.

An image processing apparatus according to the second embodiment includes, instead of the arithmetic operator 15 shown in FIG. 1, an arithmetic operator 20 as shown in FIG. 11. The arithmetic operator 20 includes the area divider 110, an attribute probability estimator 220, an adjacent-small-area connection strength calculator 230, and the lesion site detector 140.

The attribute probability estimator 220 includes, in addition to the area feature data calculator 121 that calculates feature data for each small area, a probability function estimator 221 that estimates a probability function for calculating attribute probability that a small area is attributed to the lesion site on the basis of the feature data of the small area. The probability function estimator 221 includes a clustering unit 221a that clusters the feature data distribution in the lumen image; a cluster estimator 221b that estimates a cluster corresponding to the lesion site; and a probability density function estimator 221c that estimates probability density functions of the lesion site area and the non-lesion site area on the basis of the result of the estimate of a cluster.

The adjacent-small-area connection strength calculator 230 includes the adjacency information acquiring unit 131 that acquires adjacency information, for each small area, on a small area adjacent to the small area; and a connection strength calculator 231 that calculates connection strength on the basis of the adjacency information. The connection strength calculator 231 includes an internal feature data difference calculator 231a that calculates the difference in internal feature data between adjacent small areas. The connection strength calculator 231 calculates the connection strength of the adjacent small areas on the basis of the difference in internal feature data.

Operations of the arithmetic operator 20 will be described here. All of the operations of the arithmetic operator 20 are as illustrated in FIG. 2. The detailed operations at step S30 and step S40 are different from those of the first embodiment. In the second embodiment, processes on the image 100 shown in FIG. 5 will be described as an example. In the second embodiment, two types of color feature data are used: $C_\alpha$ and $C_\beta$.

Figure 12:
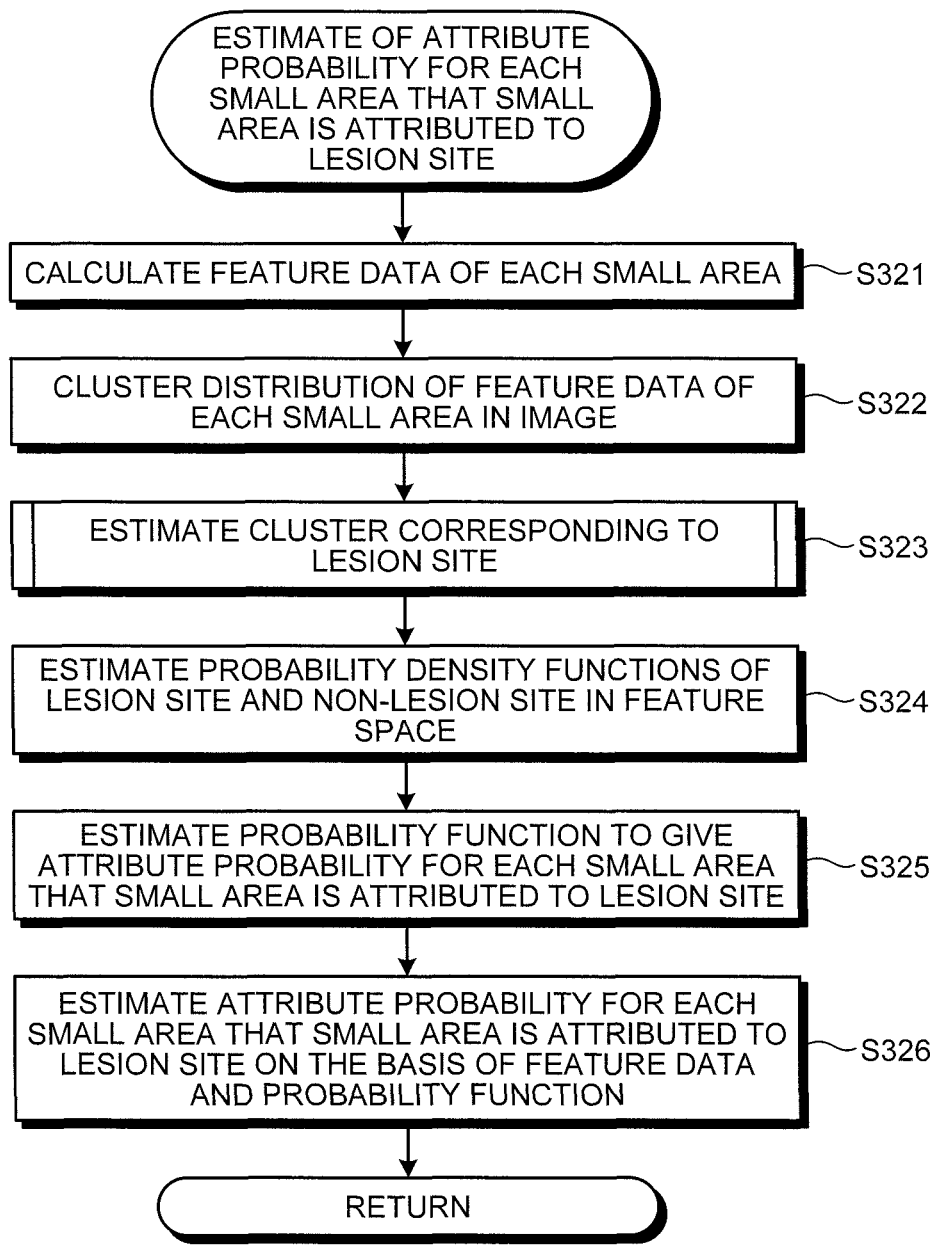
FIG. 12 is a flowchart of operations of the attribute probability estimator shown in FIG. 11.

FIG. 12 is a flowchart of operations of the attribute probability estimator 220 at step S30. The operations at step S321 correspond to step S301 shown in FIG. 6.

At step S322 following step S321, the clustering unit 221a clusters a distribution of the feature data of the small areas $A_n$ in the image 100. To perform the clustering, known methods can be used, such as a hierarchical method, a k-means method (see CG-ARTS Association, "Digital Image Processing" pp. 231 to 232), an expectation maximization algorithm (EM algorithm), and a self-organizing map.

Figure 13A:
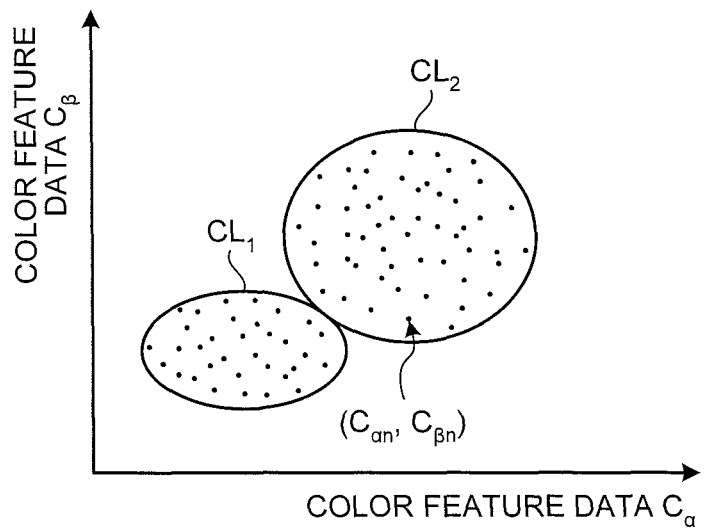
FIG. 13A is a schematic diagram of an exemplary result of clustering a feature data distribution projected in a feature space consisting of two types of color feature data.

FIG. 13A represents an exemplary result of projecting small areas $A_n$ having color feature data $(C_{\alpha n}, C_{\beta n})$ to a feature space 106 consisting of two axes of feature data $C_\alpha$ and $C_\beta$ and clustering the feature data distribution of the small areas $A_n$. In the case of FIG. 13A, the feature data $(C_{\alpha n}, C_{\beta n})$ corresponding to the small area $A_n$ is clustered in two clusters $CL_1$ and $CL_2$.

Figure 14:
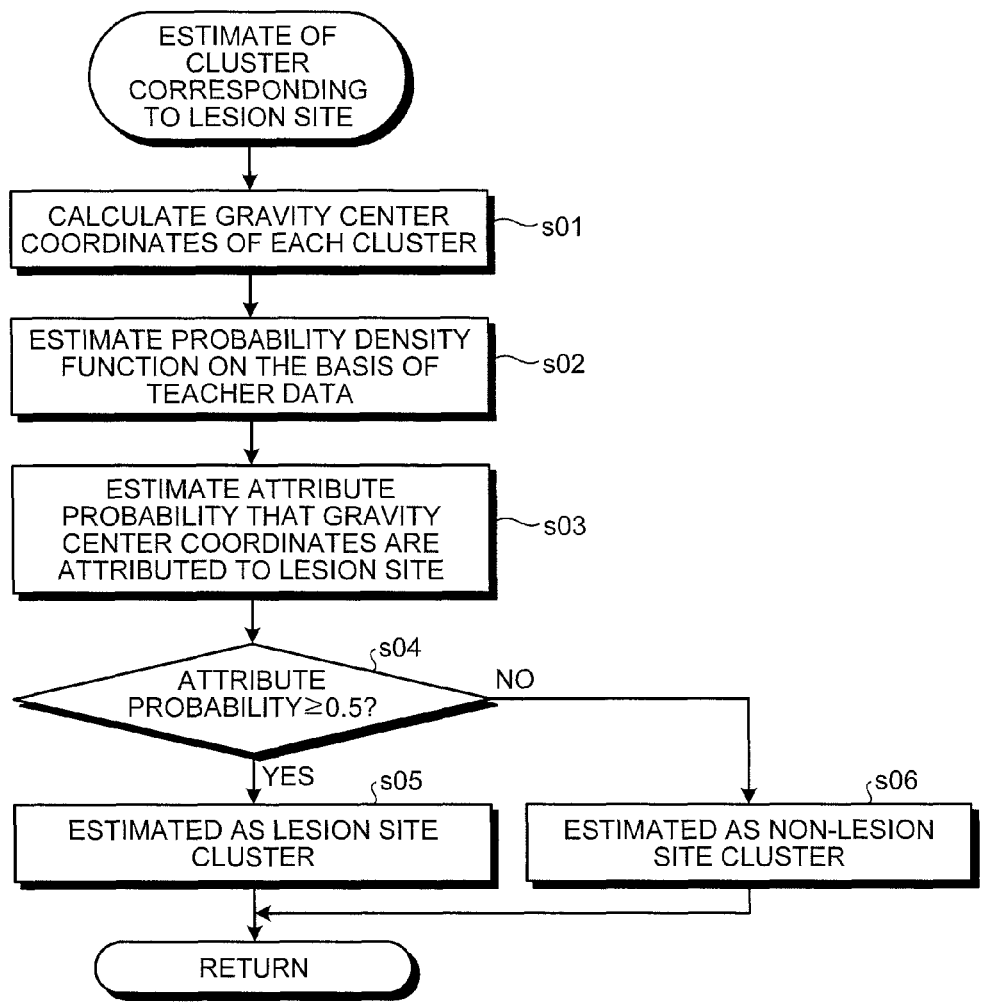
FIG. 14 is a flowchart of a process of estimating a cluster corresponding to a lesion site.

At step S323, the cluster estimator 221b estimates a cluster corresponding to the lesion site 101. FIG. 14 is a flowchart of the detailed process at step S323.

Figure 13B:
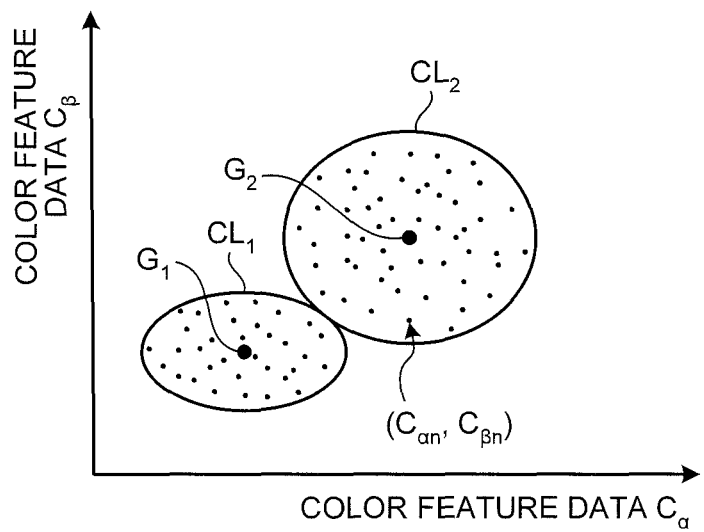
FIG. 13B is a schematic diagram depicting the centers of gravity of the clusters shown in FIG. 13A.

At step S01, the cluster estimator 221b calculates gravity center coordinates $G_1$ and $G_2$ of the respective clusters $CL_1$ and $CL_2$ (see FIG. 13B). The gravity center coordinates $G_1$ and $G_2$ correspond to average values of the feature data $(C_{\alpha n}, C_{\beta n})$ attributed to the respective clusters $CL_1$ and $CL_2$.

At step s02, on the basis of the feature data distribution of small areas in the teacher data pre-created and stored in the recording unit 14, the cluster estimator 221b estimates probability density functions $f_{S(REF)}$ and $f_{T(REF)}$ of the lesion site area and the non-lesion site area. The method of estimating probability density functions are the same as those of steps S302 to S304 of the first embodiment. However, in the second embodiment, because multiple types of feature data are used, feature vectors $(C_\alpha, C_\beta)$ are used instead of the feature data C of the first embodiment.

The procedure will be described in detail here of estimating a normal distribution function formula (probability density function) using a feature vector $Cn=(C_{\alpha n}, C_{\beta n})$ consisting of feature data of two dimensions or more.

On the basis of the feature vector $Ci=(ci\_1, ci\_2, \ldots, c, ci\_k)^t$ ($ci\_j$: jth feature data value of ith teacher data, k: dimensionality feature data), an average vector $\mu$ and a variance-covariance matrix Z are obtained, which are given by the following Equations (7) and (8):

$$\mu = \frac{1}{N_D} \sum_{i=1}^{N_D} Ci \quad (7)$$

$$Z = \frac{1}{N_D} \sum_{i=1}^{N_D} (Ci - \mu)(C_n - \mu)^t \quad (8)$$

where $N_D$ is the number of types of data.

Furthermore, from those values, coefficients of the probability density function $f_S(C_n)$ of the lesion site area are calculated, which are shown in the following Equation (9):

$$f_S(C_n) = \boxed{\frac{1}{(2\pi)^{k/2} \times |Z|^{1/2}}} \exp\left\{(C_n - \boxed{\mu})^t \times \boxed{\left(-\frac{1}{2}\right)Z^{-1}} \times (C_n - \boxed{\mu})\right\} \quad (9)$$

where $|Z|$ is the determinant of Z, and $Z^{-1}$ is the inverse matrix of Z. In Equation (9), the parts surrounded by the broken line are the coefficients to be calculated.

Coefficients of the probability density function $f_T(C_n)$ of the non-lesion site are calculated by similar arithmetic operation processing but with different data.

It is better to previously perform the process of estimating the probability density function based on the teacher data and to previously record the coefficients of the probability density function in the recording unit 14. In this case, it is satisfactory if, at step s02, the coefficients of the probability density function are read from the recording unit 14 instead of performing the arithmetic operation processing.

At step s03, the cluster estimator 221*b* estimates the attribute probability, for the gravity center coordinates $G_1$ and $G_2$, that they are attributed to the lesion site from the probability density functions $f_{S(REF)}$ and $f_{T(REF)}$ and the gravity center coordinates $G_1(C_{\alpha G1}, C_{\beta G1})$ and $G_2(C_{\alpha G2}, C_{\beta G2})$. The attribute probability can be calculated by using the above Equation (5). It is better to previously calculate, using Equation (1), the occurrence probability Pc of a lesion site area and the occurrence probability Pc' (Pc'=1−Pc) of a non-lesion site area in Equation (5) and to record them in the recording unit 14.

As a result, a cluster of the gravity center coordinates whose attribute probability that they are attributed to the lesion site is a given value (e.g., 0.5) or more is estimated as a cluster corresponding to the lesion site 101 (hereinafter, lesion site cluster) (step s04: YES at step s05). In contrast, the cluster of the gravity center coordinates whose attribute probability that they are attributed to the lesion site is smaller than the given value (e.g., 0.5) is estimated as a cluster corresponding to the non-lesion site 102 (hereinafter, non-lesion site cluster) (step s04: NO at step s06). Hereinafter, the cluster $CL_1$ shown in FIG. 13B is estimated as the lesion site cluster and the cluster $CL_2$ shown in FIG. 13B is estimated as the non-lesion cluster.

At step S324 in FIG. 12, the probability density function estimator 221*c* estimates the probability density function $f_S$ of the lesion site 101 and the probability density function $f_T$ of the non-lesion site 102 in the feature space 106. They are estimated by applying Equations (7) to (9) to the feature data distribution of the small areas $A_n$ contained in the lesion site cluster $CL_1$ and the feature data distribution of the small areas $A_n$ not contained in the lesion site cluster $CL_1$ (i.e., contained in the non-lesion site cluster $CL_2$ in FIG. 13A). Alternatively, they may be estimated by using the expectation maximization algorithm (EM algorithm) to apply the contaminated normal distribution to the feature data distribution of the small areas $A_n$ contained in the lesion site cluster $CL_1$ and the feature data distribution of the small areas $A_n$ not contained in the lesion site cluster $CL_1$. In this case, it is satisfactory if Equation (6) is an equation of a linear sum of the normal distribution $f_s(C_n)$.

At step S325, the probability function estimator 221 estimates a probability function $F_P$ that gives the attribute probability for each small area An that it is attributed to the lesion site 101. The probability function $F_P$ is estimated by estimating the occurrence probability Pc of the lesion site area by dividing the number $N_S$ of small areas $A_n$ having the feature data attributed to the lesion site cluster $CL_1$ by the number ($N_S+N_T$) of all small areas $A_n$ in the image 100 and by performing a maximum post probability estimate using the occurrence probability Pc and the probability density function $f_S$ estimated at step S324 (or the occurrence probability (1−Pc) and the probability density function $f_T$).

At step S326, on the basis of the color feature data $C_\alpha$ and $C_\beta$ of each small area $A_n$ and the probability function $F_P$ estimated at step S325, the attribute probability estimator 220 estimates the attribute probability $P_n$ for each small area An that it is attributed to the lesion site 101.

The attribute probability estimator 220 estimates the probability function as described above because of the following reasons. The features, such as color, in the lumen image 100 often appear in accordance with the sites, such as the lesion site or the non-lesion site, in the subject. Thus, by clustering the feature data distribution in the feature space 106 shown in FIG. 13A, the clusters $CL_1$ and $CL_2$ of the feature data distribution corresponding to each site are generated.

However, the features of such sites may differ depending on each subject or the difference in the imaging location in the digestive tract. In such a case, the boundary in the feature data distribution in the feature space 106, which is the boundary dividing the attribute probability of being attributed to the lesion site or the non-lesion site varies in each image (determining to area the attribute probability is higher), varies depending on each image. For example, regarding the image 100, while the clusters $CL_1$ and $CL_2$ that are divided by the boundary $Th_1$ are formed as shown in FIG. 15A, the clusters $CL_1'$ and $CL_2'$ that are divided by the different boundary $Th_2$ may be generated as shown in FIG. 15B.

For this reason, when the attribute probability for each small area $A_n$ that it is attributed to the lesion site 101 is estimated by uniformly applying, to all images, the boundary $Th_{ALL}$ calculated from the probability model based on the feature data distribution in the teacher data, the lesion site 101 may not be appropriately detected. For this reason, in the second embodiment, the feature data distribution is clustered in each image, the attribute probability of being attributed to the lesion site or the non-lesion site is determined for each cluster, and the attribute probability for each small area An that it is attributed to the lesion site or the non-lesion site is estimated using the result of the determination.

Figure 15A:
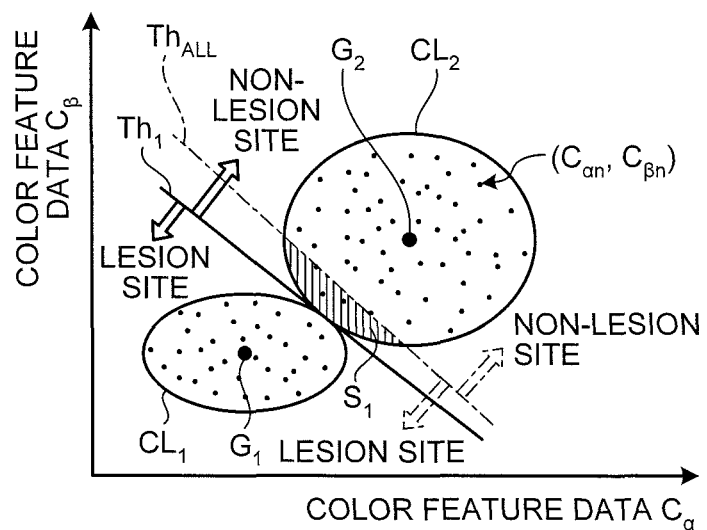
FIG. 15A is a diagram of exemplary clustering of a feature data distribution corresponding to an image.

For example, in FIG. 15A, the feature data $(C_{\alpha n}, C_{\beta n})$ contained in the area $S_1$ is attributed to the cluster $CL_2$ according to the boundary $Th_{ALL}$ but is categorized as one with higher attribute probability of being attributed to the lesion site. However, according to the second embodiment, because the boundary $Th_1$ is applied to the feature space 106 as shown in FIG. 15A, the feature data $(C_{\alpha n}, C_{\beta n})$ contained in the area $S_1$ is categorized as one with higher attribute probability of being attributed to the non-lesion site.

Figure 15B:
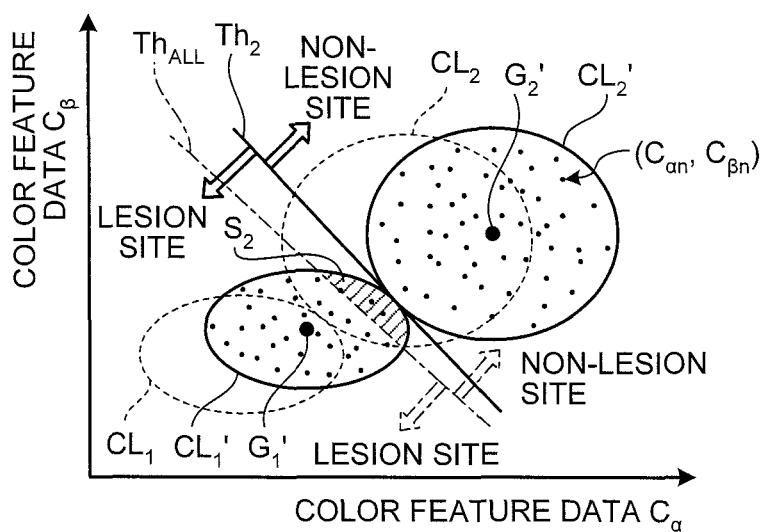
FIG. 15B is a diagram of exemplary clustering of a feature data distribution corresponding to another image.

In contrast, in FIG. 15B, the feature data $(C_{\beta n}, C_{\beta n})$ contained in the area $S_2$ is attributed to the cluster $CL_1$, according to the boundary $Th_{ALL}$ but is categorized as one with higher attribute probability of being attributed to the non-lesion site. However, according to the second embodiment, because the boundary $Th_2$ is applied to the feature space 106 as shown in FIG. 15B, the feature data $(C_{\alpha n}, C_{\beta n})$ contained in the area $S_2$ is categorized as one with higher attribute probability of being attributed to the lesion site.

Figure 16:
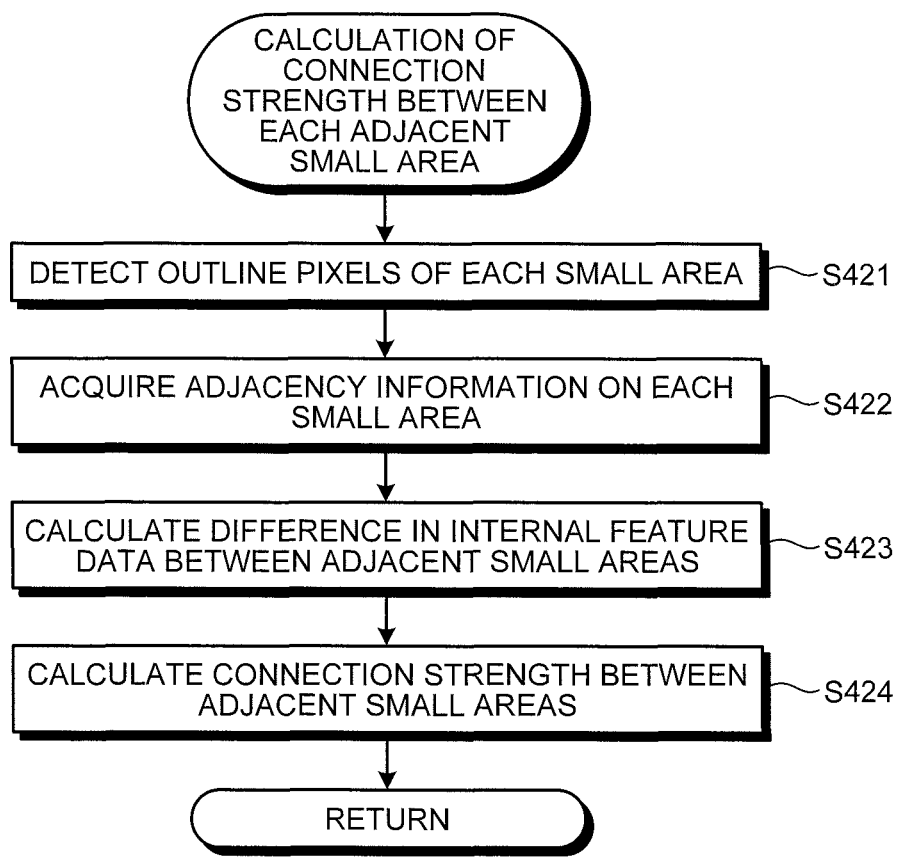
FIG. 16 is a flowchart of operations of the adjacent-small-area connection strength calculator shown in FIG. 11.

FIG. 16 is a flowchart of operations of the adjacent-small-area connection strength calculator 230 at step S40 in FIG. 2. The operations at steps S421 and S422 correspond to steps S401 and S402 shown in FIG. 8.

At step S423 following step S422, the internal feature data difference calculator 231*a* calculates a difference in feature data in the area between adjacent small areas (hereinafter, internal feature data difference) ΔC. Specifically, the feature vectors $C_n(C_{\alpha n}, C_{\beta n})$ and $C_{n'}(C_{\alpha n}, C_{\beta n})$ of small areas $A_n$ and $A_{n'}$ adjacent to each other are acquired and the magnitude is calculated of the difference between the feature data vectors $C_n$ and $C_{n'}$ given in Equation (10) (corresponding to the Euclidean distance in the feature space):

$$\Delta C = \sqrt{(C_{\alpha n} - C_{\alpha n'})^2 + (C_{\beta n} - C_{\beta n'})^2} \qquad (10)$$

The following are used as the feature data: statistic data of each of RGB components of pixel values of pixels in each small area $A_n$ (average, dispersion, distortion, kurtosis, frequency distribution etc.); texture information on each small area $A_n$; statistical data (described above), such as the luminance, color difference, hue, chroma, brightness, and color ratio that are secondarily calculated from each of RGB components of pixel values; or texture information based on these secondarily calculated vales. The type of the feature data may be the same type as that calculated at step S321 or a different type. In the former case, the feature data calculated at step S321 may be stored in the recording unit 14 and, at step S422, the feature data may be acquired from the recording unit 14.

At step S424, the connection strength calculator 231 calculates the connection strength of each adjacent small area. The fact that the difference $\Delta C$ in the internal feature data between the small areas $A_n$ and $A_{n'}$ is small means that it is highly likely that the small areas $A_n$ and $A_{n'}$ are contained in the same area and have higher connection strength. The connection strength calculator 231 calculates the connection strength such that the value of the connection strength increases as the internal feature data difference $\Delta C$ becomes smaller.

Specifically, it is satisfactory if a reduction function where the internal feature data difference $\Delta C$ is a variable is set and connection strength is calculated. Alternatively, a conversion table may be generated in which the internal feature data difference $\Delta C$ and the connection strength are associated with each other such that the connection strength increases as the internal feature data difference $\Delta C$ becomes smaller, and the connection strength may be acquired by referring to the conversion table.

As described above, according to the second embodiment, the specific area (lesion site) is detected on the basis of the connection strength that is calculated (acquired) from the difference in the internal feature data between the small areas obtained by dividing the image on the basis of the edge information, thereby the accuracy with which the specific area is detected can be improved. Furthermore, according to the second embodiment, because the probability function corresponding to the feature data distribution of the small areas is estimated in each image, the suitable attribute probability can be estimated for each image by using such a probability function, thereby the accuracy with which the specific area is detected can be further improved.

Third Embodiment

A third embodiment of the present invention will be described below.

Figure 17:
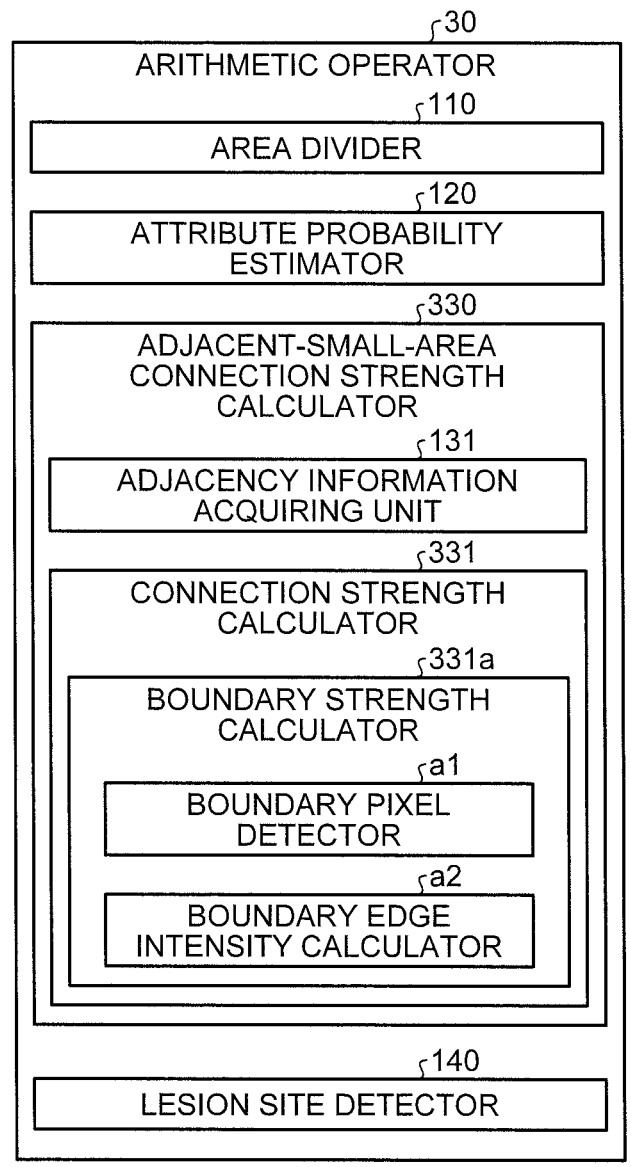
FIG. 17 is a schematic diagram of a configuration of an arithmetic operator of an image processing apparatus according to a third embodiment of the present invention.

An image processing apparatus according to the third embodiment includes, instead of the arithmetic operator 15 shown in FIG. 1, an arithmetic operator 30 as shown in FIG. 17. The arithmetic operator 30 includes the area divider 110, the attribute probability estimator 120, an adjacent-small-area connection strength calculator 330, and a lesion site detector 140. Instead of the attribute probability estimator 120, the attribute probability estimator 220 shown in FIG. 11 may be provided.

The adjacent-small-area connection strength calculator 330 includes a connection strength calculator 331 in addition to the adjacency information acquiring unit 131. The connection strength calculator 331 includes a boundary strength calculator 331a that calculates, as the connection strength, the boundary strength between small areas adjacent to each other. More specifically, the boundary strength calculator 331a includes a boundary pixel detector a1 that detects boundary pixels between the small areas adjacent to each other; and a boundary edge intensity calculator a2 that calculates edge intensity of the boundary pixels. The boundary strength calculator 331a calculates the boundary strength on the basis of the edge intensity of the boundary pixels.

Operations of the arithmetic operator 30 will be described here. The whole operations of the arithmetic operator 30 are as shown in FIG. 2 and the detailed operations at step S40 are different from those of the first embodiment.

Figure 18:
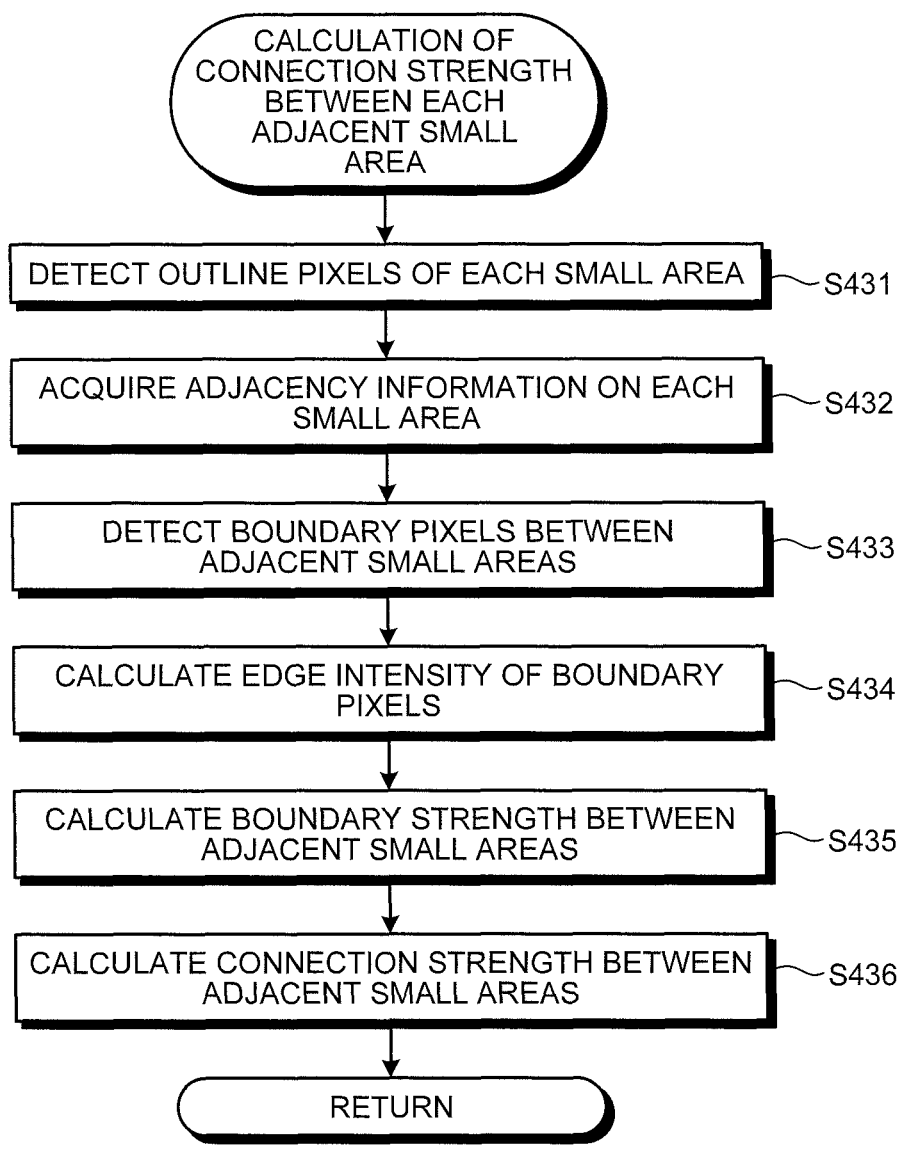
FIG. 18 is a flowchart of operations of the adjacent-small-area connection strength calculator shown in FIG. 17.

FIG. 18 is a flowchart of operations of the adjacent-small-area connection strength calculator 330 at step S40. The operations at step S431 and step S432 correspond to steps S401 and S402 shown in FIG. 8.

Figure 19:
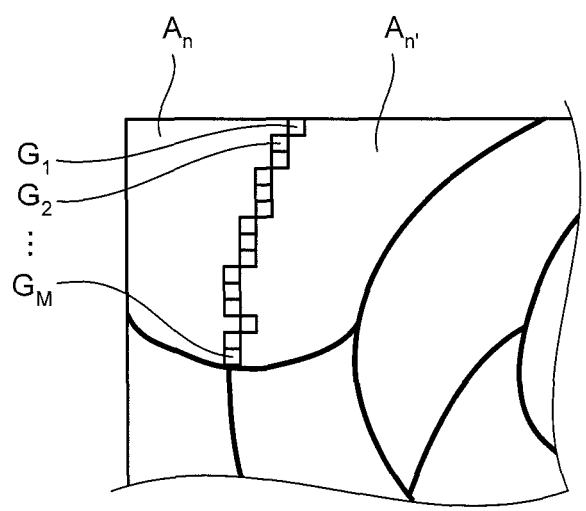
FIG. 19 is a diagram illustrating a method of calculating boundary strength.

At step S433 following step S432, as shown in FIG. 19, the boundary pixel detector a1 detects boundary pixels $G_m$ (m=1~M) between small areas $A_n$ and $A_{n'}$ adjacent to each other. As the method of detecting a boundary pixel $G_m$, for example, a known method may be used, such as tracing the outline in the area label image that is generated at step S206 (see, CG-ARTS Association, "Digital Image Processing" pp. 178 to 179).

At step S434, the boundary edge intensity calculator a2 calculates edge intensity $I_{EDG}$ ($G_m$) of the boundary pixels $G_m$. The edge intensity of the boundary pixels $G_m$ can be calculated by sequentially setting the boundary pixels detected at step S433 as pixels of interest and by performing a differential filter processing, such as Sobel filtering, on G components of the pixel values of each pixel of interest and pixels in the vicinity of the pixel of interest (see CG-ARTS Association, "Digital Image Processing" pp. 114 to 121). The G components are used because, as described above, the G components are close to the absorbance band of blood and thus well reflect the internal structure information on the lumen image. At step S434, color components may be used other than the G components or values (luminance, color difference, hue, chroma, and brightness) based on the pixel values and secondarily calculated from the pixel values by using a known conversion process.

At step S435, the boundary strength calculator 331a calculates boundary strength $I_{BOR}(=\Sigma I_{EDG}(G_m)/M)$ between the small areas adjacent to each other by obtaining a sum $\Sigma I_{EDG}(G_m)$ relating to m of the edge intensity of the boundary pixels $G_m$ calculated at step S434 and dividing the sum by the number M of the boundary pixels $G_m$.

At step S436, the connection strength calculator 331 calculates connection strength between each adjacent small area. The fact that the boundary strength $I_{BOR}$ between small adjacent areas $A_n$ and $A_{n'}$ is small means that it is highly likely the small areas $A_n$ and $A_{n'}$ are attributed to the same area and have higher connection strength. Thus, the connection strength calculator 331 calculates the connection strength such that the value of the connection strength increases as the boundary strength $I_{BOR}$ becomes smaller. Specifically, it is satisfactory if a reduction function where the boundary strength $I_{BOR}$ is a variable is set and connection strength is calculated. Alternatively, a conversion table may be created in which the boundary strength $I_{BOR}$ and the boundary strength are associated with each other such that the connection strength increases as the boundary strength $I_{BOR}$ becomes smaller, and the connection strength may be acquired by referring to the conversion table.

As described above, according to the third embodiment, because the specific area (lesion site) is detected on the basis of the connection strength that is calculated (acquired) from the boundary strength of the small areas obtained by dividing the image on the basis of the edge information, the accuracy with which the specific area is detected can be improved.

Modification

A modification of the third embodiment will be described below.

Figure 20:
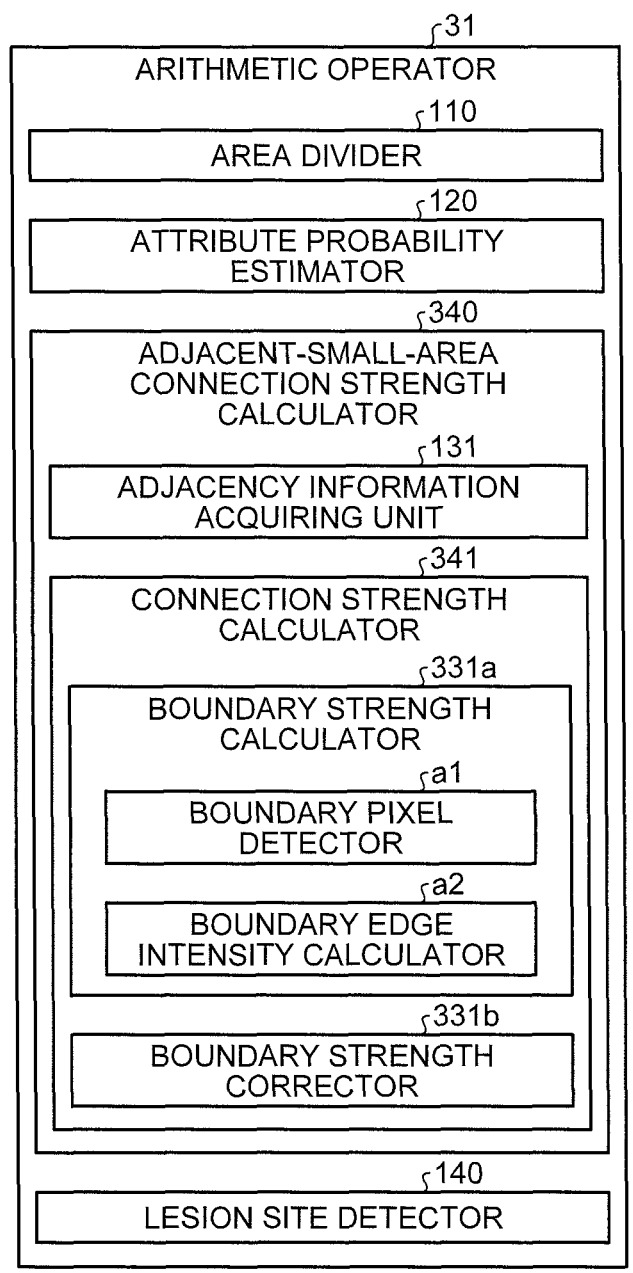
FIG. 20 is a block diagram of a configuration of an arithmetic operator of an image processing apparatus according to a modification of the third embodiment.

FIG. 20 is a block diagram of a configuration of an arithmetic operator of an image processing apparatus according to the modification. As shown in FIG. 20, an arithmetic operator 31 according to the modification includes an adjacent-small-area connection strength calculator 340 including a connection strength calculator 341 instead of the connection strength calculator 331 shown in FIG. 17. The connection strength calculator 341 further includes a boundary strength corrector 331b in addition to the boundary strength calculator 331a. The configuration of the arithmetic operator 31 excluding the boundary strength corrector 331b is the same as that of the third embodiment.

Figure 21:
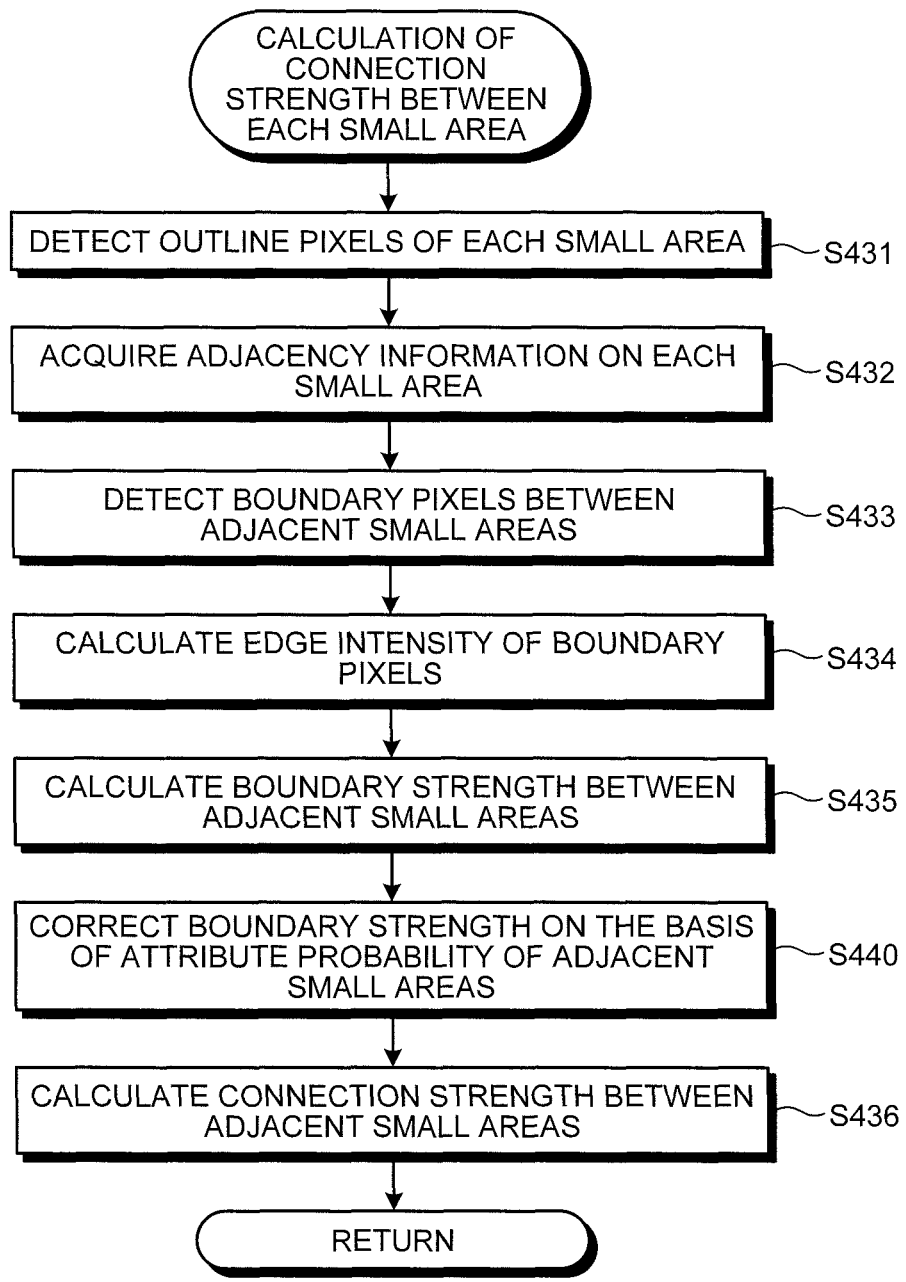
FIG. 21 is a flowchart of operations of the adjacent-small-area connection strength calculator shown in FIG. 20.

FIG. 21 is a flowchart of operations of the adjacent-small-area connection strength calculator 340. The operations at steps S431 to S435 and step S436 are the same as those of the third embodiment.

At step S440 following step S435, the boundary strength corrector 331b corrects the boundary strength $I_{BOR}$ between small areas adjacent to each other on the basis of the attribute probability $P_n$ for each small area that it is attributed to the lesion site 101 (or the attribute probability $(1-P_n)$ that it is attributed to the non-lesion site).

In a lumen image, different lesions with different color features, such as red (reddening) and white (ulcer), may be adjacent to each other or areas with different color features, such as mucosa, residue, bubbles, may be adjacent to each other. Thus, the boundary strength may not be high only between an area attributed to the lesion site and an area attributed to the non-lesion site, but higher boundary strength may be calculated from within the lesion site and within the non-lesion site. Thus, if lesion detection is performed using the boundary strength between the small areas as it is, detection accuracy may decrease. In the modification, the boundary strength between the small areas is corrected on the basis of the attribute probability of each of the adjacent small areas.

Specifically, the boundary strength corrector 331b calculates an average value $P_{AVE}$ ($P_{AVE}=(P_n+P_{n'})/2$) of the attribute probability $P_n$ and $P_{n'}$ of the small areas $A_n$ and $A_{n'}$ adjacent to each other. The boundary strength corrector 331b performs a correction such that, the closer the average value $P_{AVE}$ of attribute probability is to 1 or 0, i.e., the higher the probability that the small areas $A_n$ and $A_{n'}$ are attributed to the same area (the lesion site or the non-lesion site) is, the smaller the boundary strength $I_{BOR}$ between the small areas $A_n$ and $A_{n'}$ becomes. It is satisfactory if, for example, a reduction function $f_C(P_{AVE})$, where the average value $P_{AVE}$ of attribute probability is a variable is set and the product of the boundary strength $I_{BOR}$ and the function $f_C$ is the corrected boundary strength $I_{BOR'}$.

According to the modification, the effects can be reduced of the boundary strength between the small areas in the specific area (lesion site) or the non-lesion site (non-lesion site) on discrimination on such areas. Accordingly, the accuracy with which the specific area is detected can be improved.

Fourth Embodiment

A fourth embodiment of the present invention will be described below.

Figure 22:
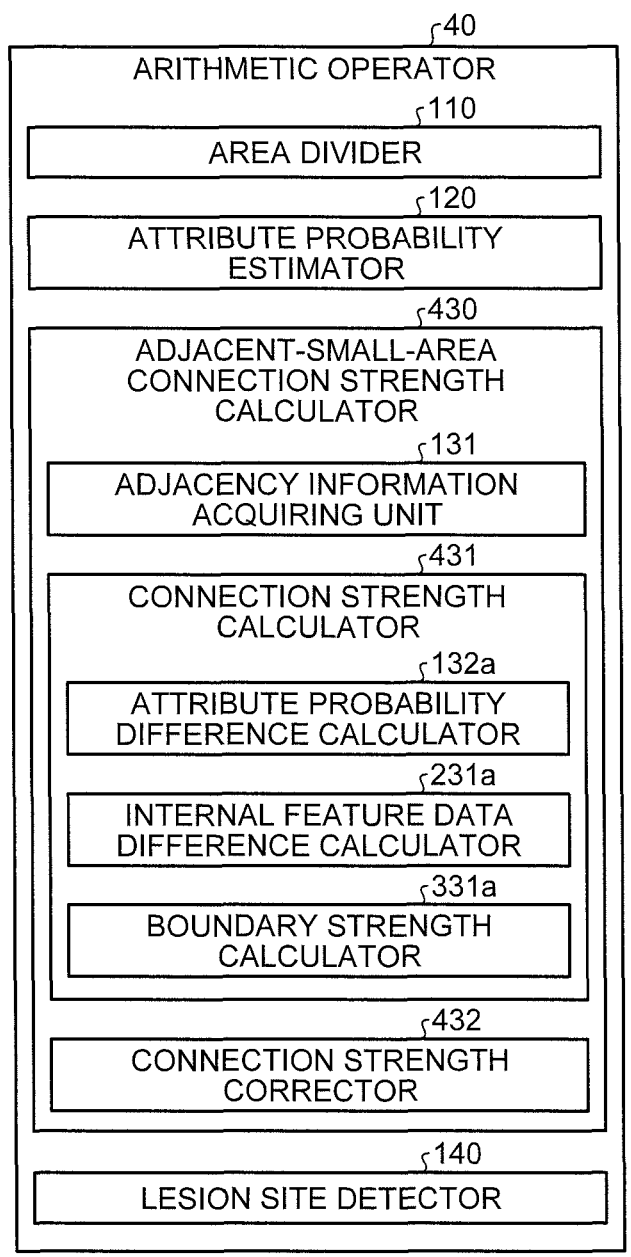
FIG. 22 is a block diagram of a configuration of an arithmetic operator of an image processing apparatus according to a fourth embodiment.

An image processing apparatus according to the fourth embodiment includes, instead of the arithmetic operator shown in FIG. 1, an arithmetic operator 40 as shown in FIG. 22. The arithmetic operator 40 includes the area divider 110, the attribute probability estimator 120, an adjacent-small-area connection strength calculator 430, and a lesion site detector 140. Instead of the attribute probability estimator 120, the attribute probability estimator 220 shown in FIG. 11 may be provided.

The adjacent-small-area connection strength calculator 430 includes the adjacency information acquiring unit 131, a connection strength calculator 431, and a connection strength corrector 432.

The connection strength calculator 431 includes the attribute probability difference calculator 132a, the internal feature data difference calculator 231a, and the boundary strength calculator 331a. The connection strength calculator 431 calculates the connection strength between the adjacent small area on the basis of the attribute probability difference $\Delta P$ calculated by the attribute probability difference calculator 132a, the internal feature data difference $\Delta C$ calculated by the internal feature data difference calculator 231a, and the boundary strength $I_{BOR}$ that is calculated by the boundary strength calculator 331a. Specifically, by calculating a weighting sum of reduction functions $f_X(\Delta P)$, $f_Y(\Delta C)$, and $f_Z(I_{BOR})$ where the attribute probability difference $\Delta P$, the internal feature data difference $\Delta C$, and the boundary strength $I_{BOR}$ are variables, the connection strength calculator 431 calculates the connection strength I given by Equation (11):

$$I = w_1 \cdot f_X(\Delta P) + w_2 \cdot f_Y(\Delta C) + w_3 \cdot f_Z(I_{BOR}) \qquad (11)$$

where $w_1$, $w_2$ and $w_3$ are weighting coefficients and are constants satisfying $w_1 \geq 0$, $w_2 \geq 0$, $w_3 \geq 0$, and $w_1+w_2+w_3=1$.

The connection strength corrector 432 corrects the connection strength I, which is calculated for each adjacent small area, on the basis of the attribute probability $P_n$ that the small area is attributed to the lesion site 101 (or the attribute probability $(1-P_n)$ that it is attributed to the non-lesion site). Specifically, the connection strength corrector 432 calculates the average value $P_{AVE}$ ($P_{AVE}=(P_n+P_{n'})/2$) of the attribute probability $P_n$ and $P_{n'}$ of the adjacent small areas $A_n$ and $A_{n'}$ and performs a correction such that, the closer the average value $P_{AVE}$ is to 1 or 0, the smaller the boundary strength I becomes. It is satisfactory if, for example, a reduction function $F_C(P_{AVE})$ where the average value $P_{AVE}$ of attribute probability is a variable is set and the product of the boundary strength I and the function $f_c$ is the corrected boundary strength I'.

As described above, according to the fourth embodiment, the connection strength of an arbitrary combination of the attribute probability difference, the internal feature data difference, and the boundary strength can be calculated by adjusting the weighting coefficients $w_1$, $w_2$, and $w_3$. Accordingly, the accuracy with which the lesion site is detected can be improved according to the feature of the image. For example, when an image is diagnosed of a site where color difference can be found in the non-lesion site, the effects of the difference in feature data between adjacent small areas can be reduced by performing an adjustment for reducing the weighting coefficient $w_2$.

Accordingly, according to the fourth embodiment, because the connection strength between the small areas can be corrected on the basis of the attribute probability of each small area that is adjacent to another, the effects can be reduced of the connection strength between the adjacent small areas in the specific area or the non-specific area on the discrimination of such areas. Accordingly, the accuracy with which specific area is detected can be improved.

As described above, according to the first to fourth embodiments, because the image is divided into multiple small areas on the basis of the edge information and then the specific area is detected from the image on the basis of the attribute probability for each small area that it is attributed to the specific area and the connection strength between the small areas adjacent to each other, area division can be performed in consideration of the feature of the small areas each including multiple pixels. Accordingly, the accuracy with which the specific area is detected can be improved.

The image processing apparatuses according to the first to fourth embodiments and the modification may be used by executing an image processing program that is stored in a recording device by a computer system, such as a personal computer or a work station, etc. Such a computer system may be used by connecting it to a device, such as another computer system or a server, via a local area network (LAN), a wide area network (WAN), or a public line such as the Internet. In this case, the image processing apparatuses according to the first to fourth embodiments and the modification may acquire image data of a lumen image via the network, output the results of the image processing to various output devices (viewer, printer, etc.) connected via the network, or store the image processing results in a storage device (a recording device and a reading device) that is connected via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a processor; and
   a memory storing computer-readable instructions that, when executed by the processor, implement:
   a small area divider that divides, on the basis of edge information of an image, the image into multiple small areas each including multiple pixels;
   an attribute probability estimator that estimates attribute probability for each of the small areas, which is probability that the small area is attributed to a specific area to be detected;
   an adjacent-small-area connection strength calculator that calculates connection strength between small areas that quantitatively indicates a degree to which the small areas adjacent to each other beyond a border between the small areas among the multiple small areas are attributed to the same area that is the specific area or a non-specific area other than the specific area; and
   a specific area detector that detects the specific area by dividing the image into the specific area and the non-specific area on the basis of the attribute probability and the connection strength.

2. The image processing apparatus according to claim 1, wherein the small area divider includes:
   an edge intensity calculator that calculates edge intensity of each pixel of the image; and
   a divider that divides the image into the small areas by using ridges of the edge intensity as a boundary.

3. The image processing apparatus according to claim 1, wherein
   the attribute probability estimator includes an area feature data calculator that calculates, for each of the small areas, feature data on the small area, and
   the attribute probability estimator estimates the attribute probability on the basis of the feature data.

4. The image processing apparatus according to claim 3, wherein the feature data is color feature data or texture feature data.

5. The image processing apparatus according to claim 1, wherein the adjacent-small-area connection strength calculator includes:
   an adjacency information acquiring unit that acquires, for each of the small areas, adjacency information on a small area adjacent to the small area; and
   a connection strength calculator that calculates the connection strength between the small areas adjacent to each other on the basis of the adjacency information.

6. The image processing apparatus according to claim 5, wherein
   the adjacency information acquiring unit includes an outline pixel detector that detects outline pixels of each of the small areas, and
   the adjacency information acquiring unit acquires adjacency information of each of the small areas on the basis of the information on the outline pixels.

7. The image processing apparatus according to claim 5, wherein
   the connection strength calculator includes an attribute probability difference calculator that calculates a difference in the attribute probability between the small areas adjacent to each other, and
   the connection strength calculator calculates connection strength between the small areas adjacent to each other on the basis of the difference in the attribute probability.

8. The image processing apparatus according to claim 1, wherein
   the specific area detector includes:
   a connection graph constructor that constructs a connected graph on the basis of the attribute probability and the connection strength; and
   a minimum cut calculator that calculates a minimum cut position in the connected graph, and
   the specific area detector detects the specific area on the basis of a result of cutting the connected graph at the minimum cut position.

9. An image processing method comprising:
   on the basis of edge information of an image, dividing the image into multiple small areas each including multiple pixels;
   estimating attribute probability for each of the small areas, which is probability that the small area is attributed to a specific area to be detected;
   calculating connection strength between small areas that quantitatively indicates a degree to which the small areas adjacent to each other beyond a border between the small areas among the multiple small areas are attributed to the same area that is the specific area or a non-specific area other than the specific area; and
   detecting the specific area by dividing the image into the specific area and the non-specific area on the basis of the attribute probability and the connection strength.

10. A computer-readable recording device with an executable program stored thereon, wherein the program instructs a processor to perform:
    on the basis of edge information of an image, dividing the image into multiple small areas each including multiple pixels;
    estimating attribute probability for each of the small areas, which is probability that the small area is attributed to a specific area to be detected;
    calculating connection strength between small areas that quantitatively indicates a degree to which the small areas adjacent to each other beyond a border between the small areas among the multiple small areas are attributed to the same area that is the specific area or a non-specific area other than the specific area; and detecting the specific area by dividing the image into the specific area and the non-specific area on the basis of the attribute probability and the connection strength.

11. An image processing apparatus comprising:

a small area divider that divides, on the basis of edge information of an image, the image into multiple small areas each including multiple pixels;

an attribute probability estimator that estimates attribute probability for each of the small areas, which is probability that the small area is attributed to a specific area to be detected;

an adjacent-small-area connection strength calculator that calculates connection strength between small areas that quantitatively indicates a degree to which the small areas adjacent to each other beyond a border between the small areas among the multiple small areas are attributed to the same area that is the specific area or a non-specific area other than the specific area; and a specific area detector that detects the specific area by dividing the image into the specific area and the non-specific area on the basis of the attribute probability and the connection strength.

* * * * *